(12) United States Patent
Yamazaki et al.

(10) Patent No.: US 9,444,153 B2
(45) Date of Patent: Sep. 13, 2016

(54) COMPOSITE MOLDING AND METHOD OF MANUFACTURING THE SAME

(71) Applicant: NISSHA PRINTING CO., LTD., Kyoto-shi, Kyoto (JP)

(72) Inventors: Seiichi Yamazaki, Kyoto (JP); Toshihiro Higashikawa, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 0 days.

(21) Appl. No.: 14/913,087

(22) PCT Filed: Jul. 17, 2014

(86) PCT No.: PCT/JP2014/068991
§ 371 (c)(1),
(2) Date: Feb. 19, 2016

(87) PCT Pub. No.: WO2015/025646
PCT Pub. Date: Feb. 26, 2015

(65) Prior Publication Data
US 2016/0211587 A1 Jul. 21, 2016

(30) Foreign Application Priority Data
Aug. 21, 2013 (JP) ................................. 2013-171174

(51) Int. Cl.
*H05K 1/09* (2006.01)
*H05K 1/03* (2006.01)
*H05K 1/00* (2006.01)
(Continued)

(52) U.S. Cl.
CPC ........... *H01R 4/04* (2013.01); *B29C 45/14016* (2013.01); *B29C 45/14065* (2013.01);
(Continued)

(58) Field of Classification Search
CPC .............. H01R 4/04; B29C 45/14065; B29C 45/14639; B29C 45/14016; B29C 2045/14147; B29K 2101/12
See application file for complete search history.

(56) References Cited

U.S. PATENT DOCUMENTS

2014/0043771 A1* 2/2014 Isoda ....................... H05K 7/02
361/728
2015/0103503 A1 4/2015 Yamazaki et al.

FOREIGN PATENT DOCUMENTS

| JP | H01-187997 A | 7/1989 |
|---|---|---|
| JP | H02-194590 A | 8/1990 |

(Continued)

OTHER PUBLICATIONS

International Search Report in PCT/JP2014/068991 dated Oct. 28, 2014.

*Primary Examiner* — Sherman Ng
(74) *Attorney, Agent, or Firm* — Global IP Counselors, LLP

(57) ABSTRACT

A composite molding comprises an insulative molded body molded into a prescribed shape; an insulative transfer layer covering at least part of a front surface of the molded body; an electrode pattern layer formed between the molded body and the transfer layer; an electrically conductive contact pin having one end side buried in the molded body and fixed thereto and an other end stuck out from the molded body; and an electrically conductive bonding agent formed between the electrode pattern layer and the molded body and bonding to the electrode pattern layer and the contact pin to form an electrical connection between the electrode pattern layer and the contact pin. This arrangement prevents defects caused by embedding a contact pin in a molded body and reliably makes an electrical connection between the contact pin and an electrode pattern layer.

17 Claims, 28 Drawing Sheets

(51) Int. Cl.
  *H01R 4/04* (2006.01)
  *B29C 45/14* (2006.01)
  *B29L 31/34* (2006.01)
  *B29K 101/12* (2006.01)

(52) U.S. Cl.
  CPC .................. *B29C45/14639* (2013.01); *B29C 2045/14147* (2013.01); *B29K 2101/12* (2013.01); *B29L 2031/3437* (2013.01)

(56) References Cited

FOREIGN PATENT DOCUMENTS

| | | |
|---|---|---|
| JP | 2009-066916 A | 4/2009 |
| JP | 2013-080632 A | 5/2013 |
| JP | 2013-080839 A | 5/2013 |
| WO | 2013180132 A1 | 12/2013 |

\* cited by examiner

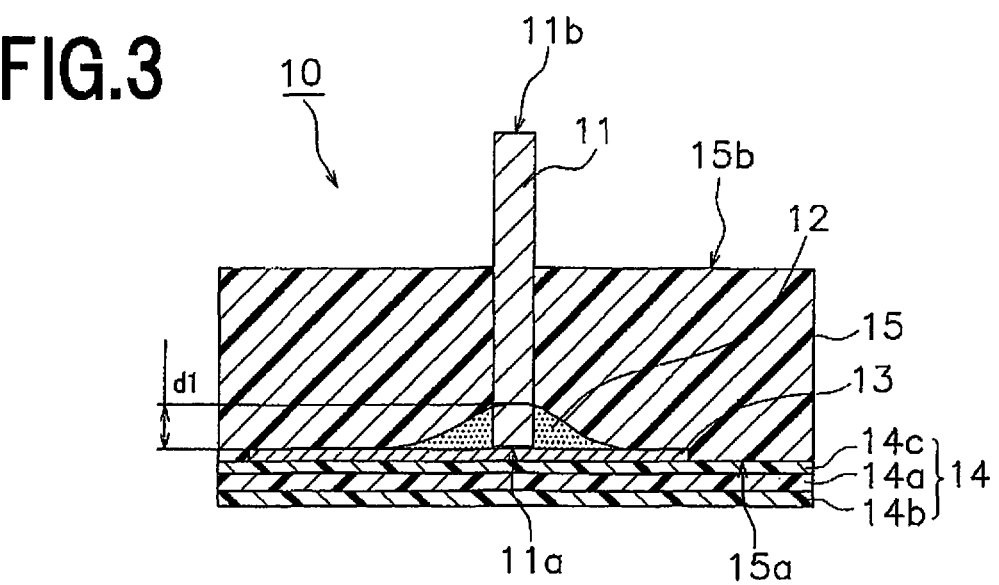

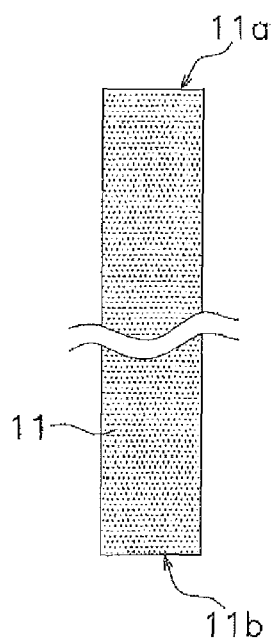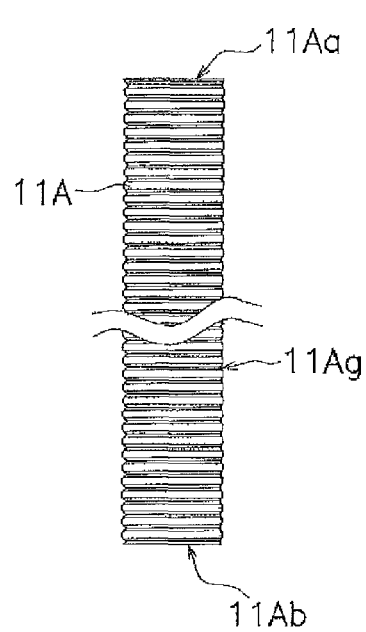

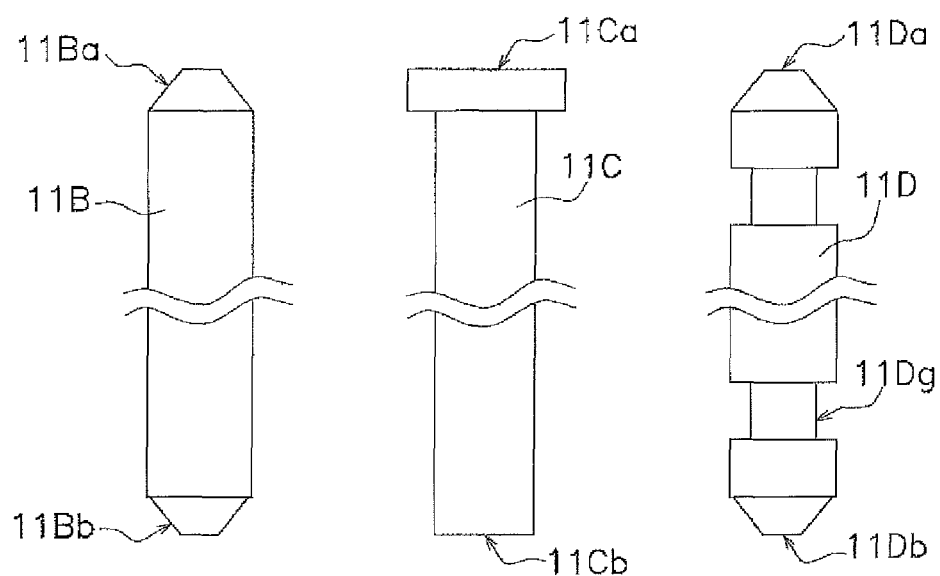

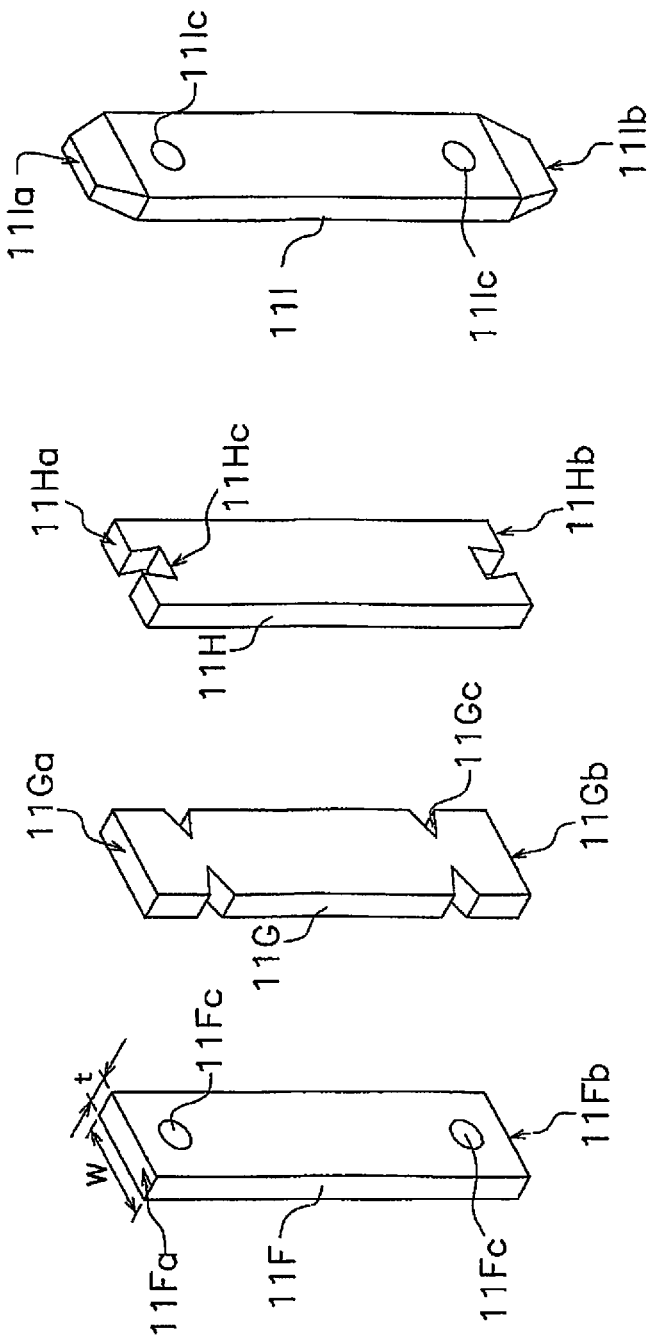

COMPOSITE MOLDING AND METHOD OF MANUFACTURING THE SAME

CROSS-REFERENCE TO RELATED APPLICATIONS

This U.S. National stage application claims priority under 35 U.S.C. §119(a) to Japanese Patent Application No. 2013-171174, filed in Japan on Aug. 21, 2013, the entire contents of Japanese Patent Application Nos. 2013-171174 are hereby incorporated herein by reference.

BACKGROUND

1. Field of the Invention

The present invention relates to a composite molding wherein a contact pin is embedded in a molded body and to a method of manufacturing the same.

2. Description of Related Art

As a method of electrically connecting a contact pin with an electrode pattern, a method of connecting by outsert molding is conventionally known. In a conventional method of connecting by outsert molding, for example, as described in Japanese Unexamined Patent Application Publication No. 2013-80632, when an electrode pattern on a base film is covered with a molded resin, an insertion hole that reaches the electrode pattern is prepared and an electrically conductive bonding agent is injected into the insertion hole, after which a contact pin is inserted, and thereby the contact pin and the electrode pattern are electrically connected.

SUMMARY

In the conventional method of connecting a contact pin with an electrode pattern using outsert molding, the electrical connection can be made reliably; however, the paste-like electrically conductive bonding agent, which includes a solvent, must be injected before inserting the contact pin into the insertion hole. At this time, because the contact pin is inserted after the electrically conductive bonding agent is injected to a location at which the electrically conductive bonding agent contacts an electrode circuit layer at a bottom part of the insertion hole, problems tend to occur, for example, the solvent in the electrically conductive bonding agent tends not to volatilize, it takes time for the bonding agent to dry and harden, or the base film dissolves or swells by the action of the solvent, leading to an abnormal external appearance. Furthermore, when an attempt is made to use a flat pin as the contact pin, the flat pin cannot be used because the insertion hole is narrow and therefore the electrically conductive bonding agent cannot be injected. In addition, because the insertion hole diameter must be made narrower than the diameter of the contact pin in order to ensure that the contact pin is not unsteady, if the pin diameter is made narrow, then a sufficient effect is not obtained and electrical conductivity is also unstable even if the pin is ultrasonically inserted.

An object of the present invention is to provide a composite molding wherein defects caused by embedding a contact pin in a molded body are prevented and an electrical connection between the contact pin and an electrode pattern layer is reliably made.

Aspects are explained below as the technical solution. These aspects can be arbitrarily combined as needed.

A composite molding according to one aspect of the present invention is a composite molding comprising: an insulative molded body molded into a prescribed shape; an insulative base film covering at least part of a front surface of the molded body and having an electrode pattern layer disposed on the front surface side of the molded body; an electrically conductive contact pin, one end side of which is buried in the molded body and fixed thereto and an other end of which pierces through the base film and is exposed; and an electrically conductive bonding agent formed between the electrode pattern layer and the molded body and bonding to the electrode pattern layer and the contact pin, thereby forming an electrical connection between the electrode pattern layer and the contact pin.

According to the composite molding thus configured, one end side of the contact pin is buried in and thereby fixed to the molded body, the other end of the contact pin pierces through the base film and thereby is exposed, and the perimeter of the portion of the contact pin at which it pierces the electrode pattern layer is bonded by the electrically conductive bonding agent. Furthermore, the electrically conductive bonding agent is formed between the electrode pattern layer and the molded body and it is possible to make do with a small quantity of the electrically conductive bonding agent, thereby making it possible to prevent an adverse effect on the external appearance and the like. In addition, the contact pin and the electrode pattern layer are bonded by the electrically conductive bonding agent while maintaining electrical conductivity, and therefore the contact pin can be electrically connected reliably to the electrode pattern layer sandwiched between the base film and the molded body.

A composite molding according to another aspect of the present invention is a composite molding comprising: an insulative molded body molded into a prescribed shape; an insulative transfer layer covering at least part of a front surface of the molded body; an electrode pattern layer formed between the molded body and the transfer layer; an electrically conductive contact pin, one end side of which is buried in the molded body and fixed thereto and an other end of which is stuck out from the molded body; and an electrically conductive bonding agent formed between the electrode pattern layer and the molded body and bonding to the electrode pattern layer and the contact pin, thereby forming an electrical connection between the electrode pattern layer and the contact pin.

According to the composite molding thus configured, one end side of the contact pin is buried in and thereby fixed to the molded body, the other end of the contact pin is stuck out from the molded body. Furthermore, the electrically conductive bonding agent is formed between the electrode pattern layer—which is formed between the molded body and the transfer layer—and the molded body and it is possible to make do with a small quantity of the electrically conductive bonding agent, thereby making it possible to prevent an adverse effect on the external appearance and the like. In addition, the contact pin and the electrode pattern layer are bonded by the electrically conductive bonding agent while maintaining electrical conductivity, and therefore the contact pin can be electrically connected reliably to the electrode pattern layer sandwiched between the transfer layer and the molded body.

The composite molding may be configured such that the other end of the contact pin pierces through the transfer layer, the electrode pattern layer, and the electrically conductive bonding agent, and thereby is stuck out from the molded body.

The composite molding may be configured such that the one end side of the contact pin is bonded to the electrode pattern layer by the electrically conductive bonding agent and the other end of the contact pin is stuck out from a front surface of the molded body on the side opposite the transfer layer. Adopting a configuration in this manner makes it possible to avoid damage to the transfer layer caused by the contact pin. Thereby, the decoration provided by the transfer layer can be applied to the front surface of the molded body without being hindered by the contact pin.

The composite molding may be configured such that the contact pin has a portion wherein a latching part having an unevenness or a hole that latches to the molded body is buried in the molded body. By adopting a configuration in this manner, when the contact pin is latched, the unevennesses, the hole, and the like serve to stop any movement of the contact pin, which makes it possible to implement a latch that tends not to loosen.

The composite molding may be configured such that, in the contact pin, unevenness is provided in a bonding area that bonds to the electrically conductive bonding agent and thereby the surface area of the bonding area is increased by the unevenness more than in the case in which the unevenness is not present. By adopting a configuration in this manner, the contact surface area between the electrically conductive bonding agent and the contact pin can be increased, and thereby the reliability of the electrical connection between the electrode pattern layer and the contact pin can be improved.

The composite molding may be configured such that the molded body has a support protruding part formed at a perimeter of the contact pin and that supports the contact pin. By adopting a configuration in this manner, by virtue of the contact pin being supported by the support protruding part, the contact pin is reliably supported without loosening, even at the thin portions of the molded body.

The composite molding may be configured such that the contact pin has a spring part, which has a spring characteristic, at a portion at which the contact pin is stuck out from the molded body. By adopting a configuration in this manner, the contact produced by the spring characteristic of the spring part tends not to separate, thereby stabilizing the electrical connection with the circuit board, or the like, connected to the contact pin.

A composite molding manufacturing method according to one aspect of the present invention comprises: a disposing process wherein a base film having an electrode pattern layer to which an electrically conductive bonding agent has been applied is disposed in a first mold, and an electrically conductive contact pin is disposed in a second mold; a mold clamping process wherein the contact pin pierces through the base film at a position at which the electrically conductive bonding agent is applied, and mold clamping of the first mold and the second mold is performed; an injecting process wherein, by the injection of a resin melt into a cavity part formed between the first mold and the second mold, the resin melt flows in along a front surface on which the electrode pattern layer of the base film is formed, and the electrically conductive bonding agent is softened by the heat of the resin melt, thereby bonding the electrode pattern layer and the contact pin with the electrically conductive bonding agent; and a cooling process wherein, by the cooling and solidification of the resin melt, a molded body is formed in which at least part of the front surface is covered by the base film, one end side of the contact pin is buried, and an other end of the contact pin is stuck out from the base film, and wherein the electrically conductive bonding agent solidifies.

According to the composite molding manufacturing method thus configured, the other end of the contact pin pierces through the base film of the molded body, which was solidified in the cooling process, and the one end side is buried, but the contact pin also pierces through the electrically conductive bonding agent formed between the base film and the molded body, and therefore the electrically conductive bonding agent improves the reliability of the electrical connection between the contact pin and the electrode pattern layer formed between the base film and the molded body. On the other hand, the electrically conductive bonding agent disposed at the appropriate location is softened and is caused to bond in the injecting process, and consequently it is possible to make do with a small quantity of the electrically conductive bonding agent and therefore to prevent any adverse effect on the external appearance and the like due to the electrically conductive bonding agent.

The composite molding manufacturing method may be configured such that the mold clamping process includes a contact pin positioning process wherein the contact pin is positioned such that the one end side of the contact pin is located inside the cavity part. By adopting a configuration in this manner, it is possible to simply implement a structure wherein the one end of the contact pin is buried in an inner part and is not exposed to an outer part.

A composite molding manufacturing method according to another aspect of the present invention comprises: a disposing process wherein a base film having a transfer layer and an electrode pattern layer to which an electrically conductive bonding agent has been applied is disposed in a first mold, and an electrically conductive contact pin is disposed in a second mold; a mold clamping process wherein mold clamping of the first mold and the second mold is performed such that the contact pin contacts the electrically conductive bonding agent or such that the contact pin pierces through the base film; an injecting process wherein, by the injection of a resin melt into a cavity part formed between the first mold and the second mold, the resin melt flows in along a front surface on which the electrode pattern layer of the base film is formed, and the electrically conductive bonding agent is softened by the heat of the resin melt, thereby bonding the electrode pattern layer and the contact pin with the electrically conductive bonding agent; and a cooling process wherein, by the cooling and solidification of the resin melt, a molded body is formed in which at least part of the front surface is covered by the transfer layer, one end side of the contact pin is buried, and an other end of the contact pin is exposed, and wherein the electrically conductive bonding agent solidifies.

According to the composite molding manufacturing method thus configured, the other end of the contact pin pierces through the molded body, which was solidified in the cooling process, and the one end side is buried, but the contact pin also pierces through the electrically conductive bonding agent formed between the transfer layer and the molded body, and therefore the electrically conductive bonding agent improves the reliability of the electrical connection between the contact pin and the electrode pattern layer formed between the transfer layer and the molded body. On the other hand, the electrically conductive bonding agent disposed at the appropriate location is softened and is caused to bond in the injecting process, and consequently it is possible to make do with a small quantity of the electrically conductive bonding agent and therefore to prevent any adverse effect on the transfer layer due to the electrically conductive bonding agent.

The composite molding manufacturing method may be configured such that, in the electrically conductive bonding agent, the thickness of the electrically conductive bonding agent in a lamination direction of the molded body and the electrode pattern layer is 3 μm or greater and less than or equal to 300 μm. By adopting a configuration in this manner, it is possible to ensure that the electrical connection does not become inadequate due to an insufficient thickness of the electrically conductive bonding agent, while the flow resistance increases and thereby the electrically conductive bonding agent is prevented from drifting during the molding of the molded body.

According to the molded body of the present invention, defects caused by embedding a contact pin in a molded body can be prevented, an electrical connection between the contact pin and an electrode pattern layer can be reliably made, and the contact pin can be reliably secured. In addition, the composite molding manufacturing method of the present invention is a manufacturing method that is suited to obtaining such a composite molding.

BRIEF DESCRIPTION OF THE DRAWINGS

FIG. 3 is a partial enlarged cross sectional view wherein part of FIG. 2 is enlarged;

FIG. 4A is a partial broken enlarged plan view that shows one example of a contact pin;

FIG. 4B is a partial broken enlarged plan view that shows another example of the contact pin;

FIG. 5A is a partial broken enlarged plan view that shows another example of the contact pin;

FIG. 5B is a partial broken enlarged plan view that shows another example of the contact pin;

FIG. 5C is a partial broken enlarged plan view that shows another example of the contact pin;

FIG. 9A is an enlarged oblique view that shows another example of the contact pin;

FIG. 9B is an enlarged oblique view that shows another example of the contact pin;

FIG. 9C is an enlarged oblique view that shows another example of the contact pin;

FIG. 9D is an enlarged oblique view that shows another example of the contact pin;

DESCRIPTION OF EMBODIMENTS

[First Embodiment]

A composite molding according to a first embodiment of the present invention and a method of manufacturing the same are explained below, with reference to FIG. 1 through FIG. 7D.

(1) Overview Of Composite Molding

Figure 1:
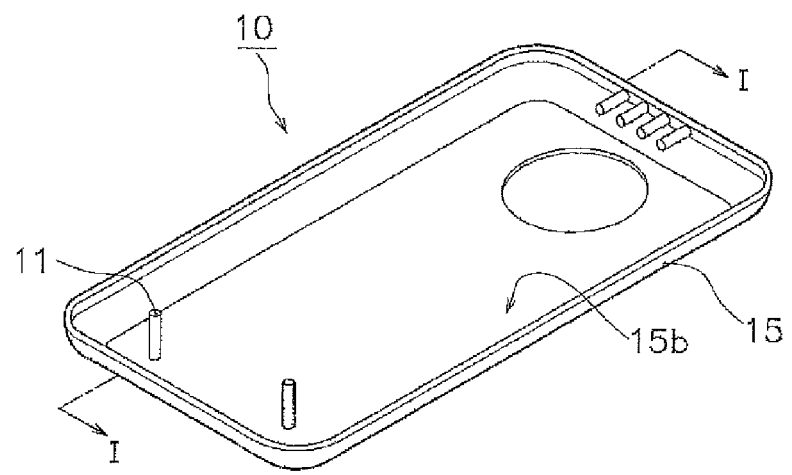
FIG. 1 is an oblique view that shows one example of a configuration of a composite molding according to a first embodiment.
Figure 2:
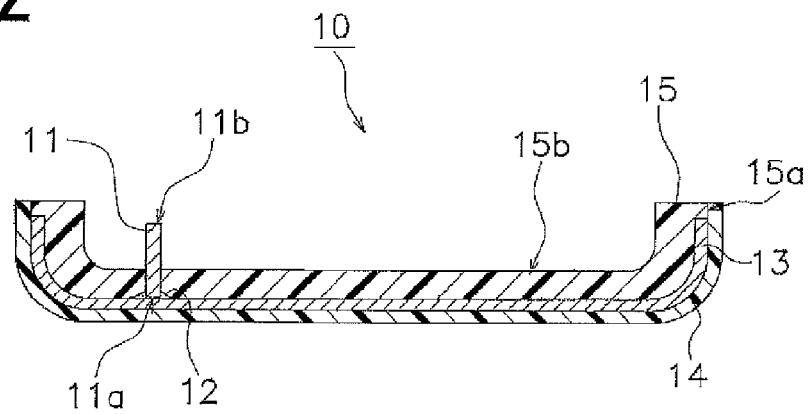
FIG. 2 is a cross sectional view taken along line I-I of the composite molding in FIG. 1.

FIG. 1 is an oblique view for explaining an overview of a configuration of the composite molding according to the first embodiment of the present invention. FIG. 2 is a cross sectional view taken along line I-I in FIG. 1. In addition, FIG. 3 shows, within the cross sectional structure shown in FIG. 2, an enlargement of the periphery of a connecting portion between a contact pin and an electrode pattern layer.

A composite molding 10 shown in FIG. 1 through FIG. 3 comprises a contact pin 11, an electrically conductive bonding agent 12, an electrode pattern layer 13, a transfer layer 14, and a molded body 15. The molded body 15 is formed by injection molding, which is described below, a thermoplastic resin such that it takes on a shape wherein the perimeter of an oblong plate shaped member is provided with an erect wall. The side on which a center part is recessed is a rear surface 15b of the molded body 15, and a side opposite thereof is a front surface 15a. The transfer layer 14 is formed over the entire front surface 15a of the molded body 15.

The electrode pattern layer 13 is formed on the front surface side of the molded body 15. The underside of the electrode pattern layer 13 is covered by the transfer layer 14. In other words, the electrode pattern layer 13 is disposed between the front surface 15a of the molded body 15 and the transfer layer 14.

One end 11a of the contact pin 11 is electrically connected to the electrode pattern layer 13, and an other end 11b thereof is exposed to the rear surface 15b of the molded body 15. The composite molding 10 is, for example, a rear cover of an electrical product, and the contact pin 11 is a member for connecting an electrical circuit of an inner part of the electrical product with the electrode pattern layer 13. The contact pin 11 is supported inside a mold in a state wherein its positional relationship to the electrode pattern layer 13 is maintained as shown in FIG. 2, and a part thereof is buried in the molded body 15 by the hardening of a resin melt during injection molding.

The electrically conductive bonding agent 12 is applied to the portion at which the contact pin 11 and the electrode pattern layer 13 make contact. The electrically conductive bonding agent 12 itself has high electrical conductivity. Consequently, the contact pin 11 and the electrode pattern layer 13 bond to one another by the electrically conductive bonding agent 12, and thereby an electrical path is formed via the electrically conductive bonding agent 12 between the contact pin 11 and the electrode pattern layer 13. As shown in FIG. 3, the electrically conductive bonding agent 12 is disposed such that it is obstructed by the electrode pattern layer 13 and such that the portion that contacts the transfer layer 14 becomes small. Such a structure prevents abnormalities in the external appearance of the transfer layer 14 caused by the dissolving, swelling, or the like of the transfer layer 14 by the electrically conductive bonding agent 12.

(2) Structural Member (2-1) Contact Pin

The contact pin 11 is formed of a material having electrical conductivity. As the material with which the contact pin 11 is formed, it is possible to use, for example: a metal material, such as copper, brass, phosphor bronze, iron, stainless steel, or the like; or a material whose front surface is plated with nickel, gold, or the like. If the contact pin 11 is made into a columnar shape, then, giving consideration to contact with the electrode pattern layer 13 and the effect on the transfer layer 14, the outer diameter is preferably φ 0.2-2.0 mm and more preferably φ 0.4-1.0 mm. The size of the contact pin 11 is appropriately selected in accordance with the application of the composite molding 10, such as a smart phone, a tablet type personal computer, or the like.

Various shapes other than the shapes shown in FIGS. 4A, 4B, 5A, 5B and 5C can be adapted to the shape of the contact pin 11. FIG. 4A is an enlarged plan view of the contact pin 11 described in FIG. 1. The contact pin 11 is, for example, a cylindrical member made of copper, and a matted unevenness is formed on the front surface. A contact pin 11A shown in FIG. 4B has a surface shape that differs from that of the contact pin 11 shown in FIG. 4A but also can be used instead of the contact pin 11. The contact pin 11A shown in FIG. 4B likewise is, for example, a cylindrical member made of copper, and annular knurled grooves 11Ag are provided on the pin surface. The contact pine 11A has a one end 11Aa and the other end 11Ab. By unevenness, such as the matting and the knurled grooves 11Ag, on the pin surfaces of the contact pins 11, 11A being provided in this manner, the molded body 15 is incorporated into and solidifies in the unevenness of the pin surfaces, which makes it difficult for the contact pins 11, 11A to come off.

Contact pins 11B, 11C, 11D shown in FIG. 5A, FIG. 5B, and FIG. 5C likewise have shapes that differ from the shape of the contact pin 11 shown in FIG. 4A and also can be used instead of the contact pin 11. The contact pin 11B shown in FIG. 5A likewise is, for example, a cylindrical member made of copper, but pin tips of one end 11Ba and the other end 11Bb are fabricated into a tapered shape. The pin tip of the one end 11Ba of the contact pin 11B is tapered, and thereby the one end 11Ba of the contact pin 11B tends to bite into the electrically conductive bonding agent 12, stabilizing contact between the contact pin 11B and the electrically conductive bonding agent 12. Furthermore, by making both the one end 11Ba and the other end 11Bb of the contact pin 11B into a tapered shape as shown in FIG. 5A, there is no need to verify the direction of the contact pin 11B during manufacture, and therefore manufacture becomes easy. The contact pin 11C shown in FIG. 5B likewise is, for example, a cylindrical member made of copper, and the pin tip of a one end 11Ca is flared into a discoidal shape and the other end 11Cb is not flared. Other than the discoidal shape as shown in FIG. 5B, ways of flaring the contact pin 11C also include a columnar shape, an inverse conical shape (not shown), and the like. In the contact pin 11C, the flared one end 11Ca is retained and comes off only with difficulty even if the front surface is not provided with the matting, the knurled grooves 11Ag, or the like as in the contact pins 11, 11A. The contact pin 11D shown in FIG. 5C likewise is, for example, a cylindrical member made of copper, and not only are the pin tips of the one end 11Da and the other end 11Db fabricated into a tapered shape, the same as in the contact pin 11B of FIG. 5A, but an annular recessed part 11Dg is formed in a conductor portion. The recessed part 11Dg is a portion in which the diameter is smaller than that of the conductor portion.

Figure 6A:
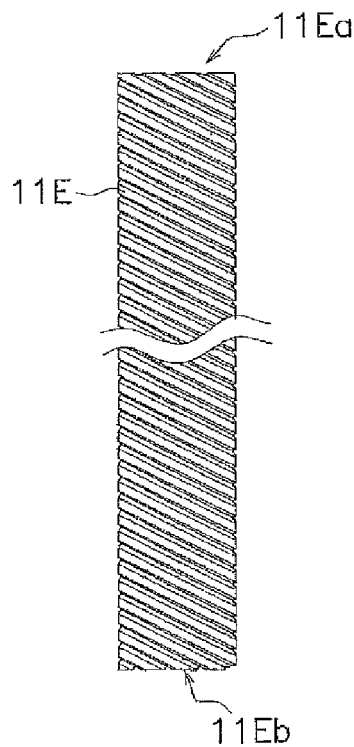
FIG. 6A is a partial broken enlarged plan view that shows another example of the contact pin.
Figure 6B:
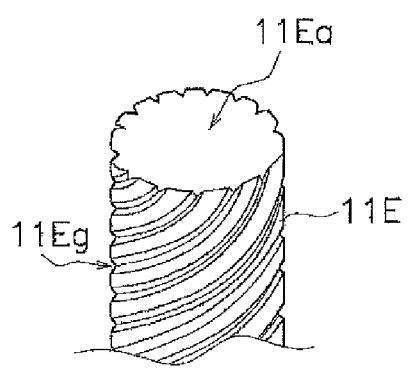
FIG. 6B is a partial enlarged oblique view of the contact pin in FIG. 6A.

A contact pin 11E shown in FIG. 6A and FIG. 6B likewise has a shape that differs from that of the contact pin 11 shown in FIG. 4A and also can be used instead of the contact pin 11. The contact pin 11E has a one end 11Ea and the other end 11Eb. FIG. 6A is a plan view of the contact pin 11E, and FIG. 6B is an oblique view viewed from the side of one end 11Ea. Knurled grooves 11Eg formed on the contact pin 11E are tilted diagonally with respect to a pin axial direction. In other words, the knurled grooves 11Eg are formed into helical shapes on the pin surface. In the contact pin 11E, too, the same as in the previously explained contact pin 11A having the knurled grooves 11Ag, the molded body 15 is incorporated into and solidifies in the knurled grooves 11Eg on the pin surface, and consequently the contact pin 11E tends not to come off. In addition, because unevenness is formed by the knurled grooves 11Eg on a circumferential part of one end 11Ea of the contact pin 11E, the electrically conductive bonding agent 12 is incorporated into the unevenness of the circumferential part of the one end 11Ea, and thereby the surface area of contact with the electrically conductive bonding agent 12 increases and a reliable contact with the contact pin 11E can be formed.

(2-2) Electrically Conductive Bonding Agent

The electrically conductive bonding agent 12 contains, for example, an electrically conductive filler and a binder. As the electrically conductive filler, it is possible to use, for example: a powder of an electrically conductive material, such as gold, silver, copper, aluminum, nickel, carbon, graphite, or the like; or an electrically conductive powder wherein the surfaces of nonconductive particles, such as urethane particles or silica particles, have been plated with a metal, such as copper, nickel, silver, or the like. In addition, as the binder, it is possible to use a binder wherein a tackifier that exhibits stickiness is combined, by the heat of a rosin based resin, a rosin ester based resin, a petroleum resin, or the like, into a thermoplastic resin, such as a polyester based resin, an acrylic resin, a vinyl chloride/vinyl acetate copolymer resin, a vinyl chloride/vinyl acetate/maleic acid copolymer resin, a thermoplastic urethane resin, or the like. This binder softens by the heat arising during the molding of the molded body 15 and thereby exhibits a function of bonding the contact pin 11 and the electrode pattern layer 13 together. The electrically conductive bonding agent 12 is formed in advance by, for example, applying it to the electrode pattern layer 13 before the molded body 15 is molded. To apply the electrically conductive bonding agent 12, a means is used wherein the binder is dissolved in a solvent and made into a paste, and that paste-like electrically conductive bonding agent 12 is then screen printed, dispensed, or the like. In this case, for example, the solvent of the applied electrically conductive bonding agent 12 is dried before the molding of the molded body 15. It is also possible to apply the electrically conductive bonding agent 12 without using the solvent; for example, the thermoplastic resin of the binder can be hot melted, and the electrically conductive filler can be used as the hot melt electrically conductive bonding agent dispersed in that binder. Because the hot melt electrically conductive bonding agent does not contain the solvent, the hot melt electrically conductive bonding agent is a solid or semisolid at room temperature; consequently, there is no need to dry the hot melt electrically conductive bonding agent and, if the hot melt electrically conductive bonding agent is cooled and solidified after it is hot melted by the resin melt during the injection of the resin melt, then the contact pin 11 and the electrode pattern layer 13 can be bonded together.

A thickness d1 described in FIG. 3 is a distance from a portion at which the electrically conductive bonding agent 12 contacts an upper surface of the electrode pattern layer 13 to a mountain peak of the electrically conductive bonding agent 12 piled up into a mountain shape. Because the thickness d1 becomes small if the contact pin 11 is stuck into the mountain peak of the electrically conductive bonding agent 12, the thickness d1 is preferably in the range of 3 μm or greater and less than or equal to 300 μm in the dry state after the electrically conductive bonding agent 12 has been applied and any volatile components have evaporated. In other words, the thickness d1 is the maximum value of the wall thickness in the lamination direction of the molded body 15 and the electrode pattern layer 13. If the thickness d 1 of the electrically conductive bonding agent 12 is too thick, then the electrically conductive bonding agent 12 adversely flows when the resin melt is injected in order to mold the molded body 15. Conversely, if the thickness d1 of the electrically conductive bonding agent 12 is too thin, then the electrical connection between the contact pin 11 and the electrode pattern layer 13 will tend to become unstable.

(2-3) Electrode Pattern Layer

The electrode pattern layer 13 may be formed by screen printing or gravure printing using electrode pattern layer ink. Alternatively, it can also be formed by: pattern printing a water soluble resin onto a film; then performing a process of depositing a metal, for example, aluminum, copper, or the like; further performing a rinsing process; and rinsing, with water, the metal vapor deposited film on the water soluble resin together with the water soluble resin. In this case, the thickness of the metal vapor deposited layer is approximately 400-1,000 Å. As another method, the electrode pattern can also be formed by, for example, laminating a base film with a metal foil, such as aluminum or copper, resist pattern printing, and then etching. A film similar to a base film 18, which is described below, can be used as the base film. The thickness of the electrode pattern layer 13 made with the metal foil is, for example, 6-18 μm.

The ink for the electrode pattern layer contains an electrically conductive filler and a binder. As the electrically conductive filler, it is possible to use, for example: a powder of an electrically conductive material, such as gold, silver, copper, aluminum, nickel, carbon, graphite, or the like; or an electrically conductive powder wherein the surfaces of nonconductive particles, such as urethane particles or silica particles, have been plated with a metal, such as copper, nickel, silver, or the like. In addition, as the binder, it is possible to use a binder wherein a tackifier that exhibits stickiness is combined, by the heat of a rosin based resin, a rosin ester based resin, a petroleum resin, or the like, into a thermoplastic resin, such as a polyester based resin, an acrylic resin, a vinyl chloride/vinyl acetate copolymer resin, a vinyl chloride/vinyl acetate/maleic acid copolymer resin, a thermoplastic urethane resin, or the like. The solvent used in this ink is suited to screen printing, gravure printing, and the like. Other than a thermoplastic resin, it is also possible to use, in the binder, a thermosetting resin—such as one that is epoxy based, urethane based, or acrylic based—an ultraviolet light setting molding resin, or the like.

(2-4) Transfer Layer

The transfer layer 14 is formed on a base film 30 (refer to FIGS. 7A, 7B, 7C and 7D). The base film 30 is, for example: a resin film formed of a polyester resin, an acrylic resin, a polycarbonate resin, a polybutylene terephthalate (PBT) resin, a styrene resin, or an ABS resin; a multilayer film of acrylic resin and ABS resin; or a multilayer film of acrylic resin and polycarbonate resin.

The transfer layer 14 shown in FIG. 2 covers the entire front surface 15a of the molded body 15; however, the transfer layer 14 does not necessarily cover the entire surface and it is sufficient if it covers at least part of the front surface 15a of the molded body 15. As shown in FIG. 3, the transfer layer 14 comprises: a design ink layer 14a, which is for the drawing, coloring, and the like of a design; a topcoat layer 14b, which is for protecting the design ink layer 14a; and an insulative layer 14c. The film thickness of the transfer layer 14 is preferably selected from the range of several to several tens of micrometers, with consideration to the design characteristics and drying during the formation of the transfer layer 14.

The design ink layer 14a is provided in order to decorate the external appearance of the composite molding 10. As the material of the transfer layer 14, it is possible to use, for example, a thermoplastic resin such as thermoplastic urethane resin, an acrylic based resin, a vinyl chloride/vinyl acetate copolymer resin, or the like. Alternatively, it is possible to use an ink wherein the binder is: a thermosetting resin, such as an acrylic urethane resin, a polyester urethane resin, a urea melamine resin, or the like; an ultraviolet light setting resin; or a thermoplastic resin.

Examples that can be given of the material of the topcoat layer 14b are: a UV setting or ionizing radiation setting resin, such as polyester acrylate, urethane acrylate, or the like; or a thermosetting resin, such as one that is acrylic based, urethane based, or the like. The insulative layer 14c is formed of a highly insulative thermoplastic resin. The insulative layer 14c is a layer for ensuring insulation from the electrode pattern layer 13 and is additionally adhesive with respect to the molded body resin. When the insulative characteristic of the design ink layer 14a is high, the insulative layer 14c may be omitted.

Such a transfer layer 14 may comprise other layers, such as a peel-off layer, a adhesive layer, an anchor layer, or the like. The adhesive layer is formed of, for example, the thermoplastic resin used in the binder and the like of the electrically conductive bonding agent 12, and exhibits a thermosensitive bonding function.

(2-5) Molded Body

The molded body 15 is formed using a thermoplastic resin or an elastomer that may be colored or not colored and may be transparent, semitransparent, or opaque. A general purpose thermoplastic resin, such as a polystyrene based resin, a polyolefin based resin, ABS resin, or AS resin, is preferably used as the material of the molded body 15. Otherwise, a polycarbonate based resin, a polyacetal resin, an acrylic based resin, a polyethylene terephthalate based resin, a polybutylene terephthalate resin, an engineering resin (a polysulfone resin, a polyphenylene sulfide based resin, a polyphenylene oxide based resin, a polyarylate based resin, or the like), or a polyamide based resin can be used as the material of the molded body 15. In addition, natural rubber, a synthetic rubber, or the like can be used as the material of the molded body 15. A reinforcing material, such as glass fibers, an inorganic filler, or the like, can also be added to the molded body 15.

(3) Composite Molding Manufacturing Method

Figure 7A:
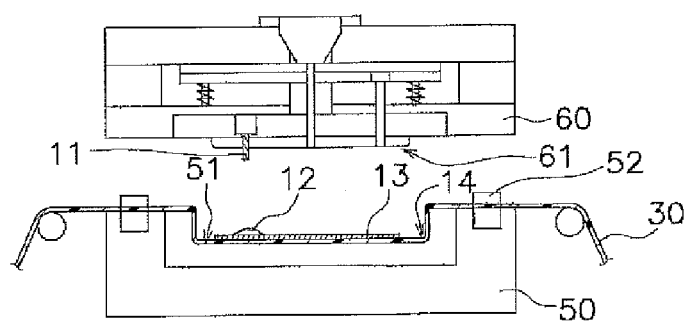
FIG. 7A is a cross sectional view that shows a disposing process for an injection molding in-mold decoration.

One example of a method of manufacturing the composite molding 10 will be explained, with reference to FIG. 7A to FIG. 7D. FIG. 7A shows a disposing process. In the disposing process, the base film 30, which comprises the electrode pattern layer 13, to which the electrically conductive bonding agent 12 has been applied, and the transfer layer 14, is disposed on an inner surface 51 of a first mold 50. The base film 30 is fixed by clamps 52. Next, as needed, the base film is softened by the heating of a heater and is aligned with a cavity surface by air suction from the first mold 50 side. The contact pin 11 is disposed in a second mold 60. The contact pin 11 is sucked and thereby affixed to the second mold 60.

Figure 7B:
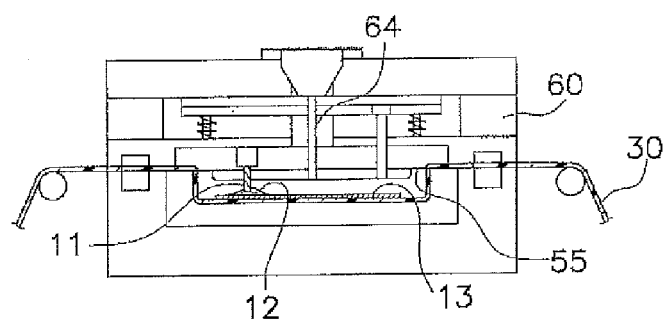
FIG. 7B is a cross sectional view that shows a mold clamping process for an injection molding in-mold decoration.

Next, a mold clamping process shown in FIG. 7B is performed. In the mold clamping process, the molds are clamped such that the electrically conductive bonding agent 12, which is disposed in the first mold 50, and the contact pin 11, which is disposed in an inner surface 61 of the second mold 60, contact one another. During mold clamping, the one end 11a of the contact pin 11 makes contact with while strongly pushing against the front surface of the electrically conductive bonding agent 12, and therefore compressive stress remains in the electrically conductive bonding agent 12. A cavity part 55 is formed between the first mold 50 and the second mold 60.

Figure 7C:
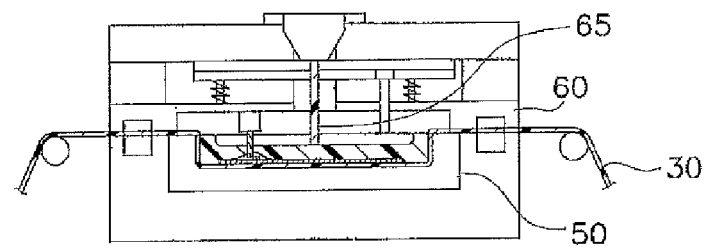
FIG. 7C is a cross sectional view that shows an injecting process for an injection molding in-mold decoration.

FIG. 7C shows an injecting process. In the injecting process, resin melt 65 is injected through a sprue 64 to the cavity part 55 formed between the first mold 50 and the second mold 60. The resin melt 65 bonds tightly to the front surfaces of the contact pin 11 and the electrically conductive bonding agent 12; in the electrically conductive bonding agent 12, the binder softens by the heat directly conducted from the resin melt 65 and the heat conducted via the contact pin 11 and thereby exhibits a bonding function. At this time, the heat and pressure of the resin melt 65 softens and deforms the electrically conductive bonding agent 12, and therefore the compressive stress arising between the contact pin 11 and the electrically conductive bonding agent 12 relaxes, and the contact pin 11 sinks into the electrically conductive bonding agent 12. Furthermore, the binder of the electrically conductive bonding agent 12 softens and the electrically conductive bonding agent 12 bonds to the contact pin 11 in the state wherein the bond with the electrode pattern layer 13 is maintained, and thereby an electrical connection is formed between the electrode pattern layer 13 and the contact pin 11. At this time, the electrically conductive bonding agent 12, which is pushed up around the contact pin 11, bonds such that it covers the periphery of the one end 11a, that is, a tip part, of the contact pin 11, which raises the degree of adhesion with the contact pin 11. When the resin melt 65 fills the cavity part 55 and the flow stops, the resin melt 65 is cooled via the first mold 50 and the second mold 60. The resin melt 65 cools and hardens and thereby the molded body 15 is formed.

Figure 7D:
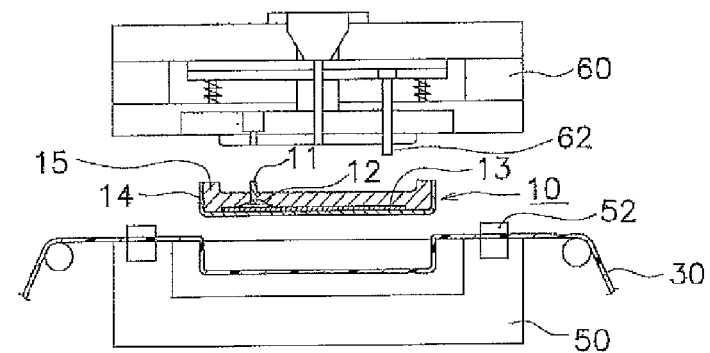
FIG. 7D is a cross sectional view that shows a mold opening process for an injection molding in-mold decoration.

Next, as shown in FIG. 7D, the first mold 50 and the second mold 60 are opened. At this time, the base film 30 and the transfer layer 14 delaminate, with the composite molding 10 remaining in the second mold 60 and the base film 30 remaining in the first mold 50, and thereby the composite molding 10 is removed from the second mold 60. The composite molding 10 is, for example, separated from the second mold 60 by an eject pin 62, which protrudes from the second mold 60, and the composite molding 10 is held and removed by a removing robot (not shown) that has ingressed.

[Second Embodiment]

(4) Overview of Composite Molding

Figure 8:
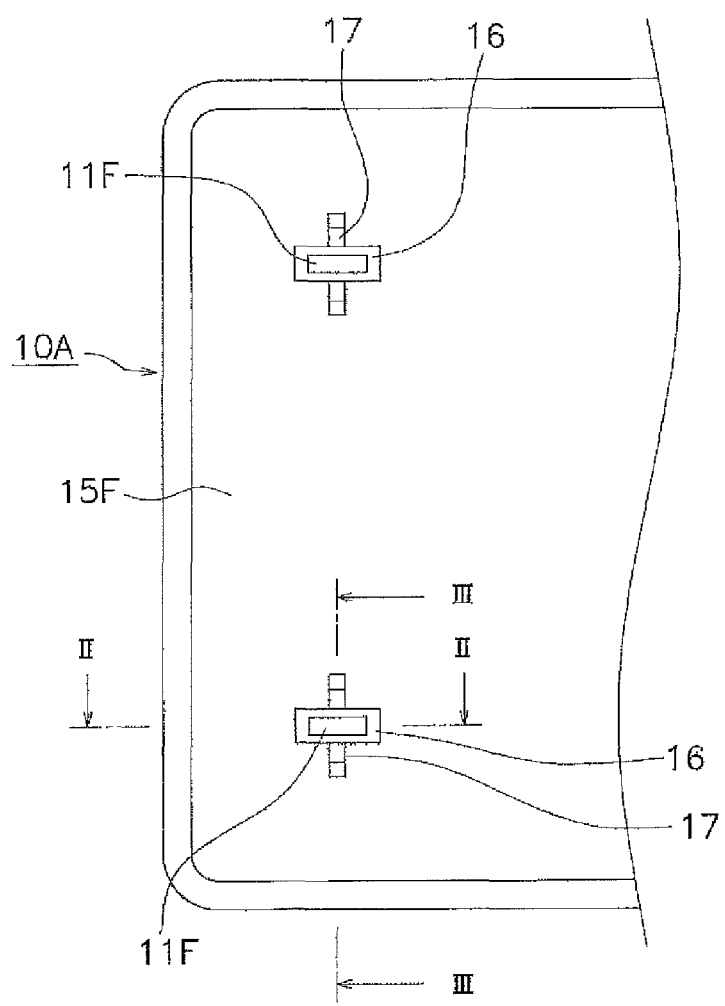
FIG. 8 is an oblique view that shows one example of the configuration of the composite molding according to a second embodiment.
Figure 10A:
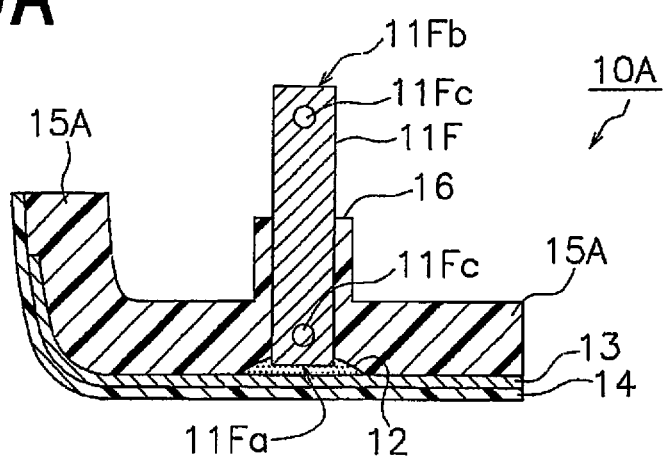
FIG. 10A is a cross sectional view taken along line II-II in FIG. 8.
Figure 10B:
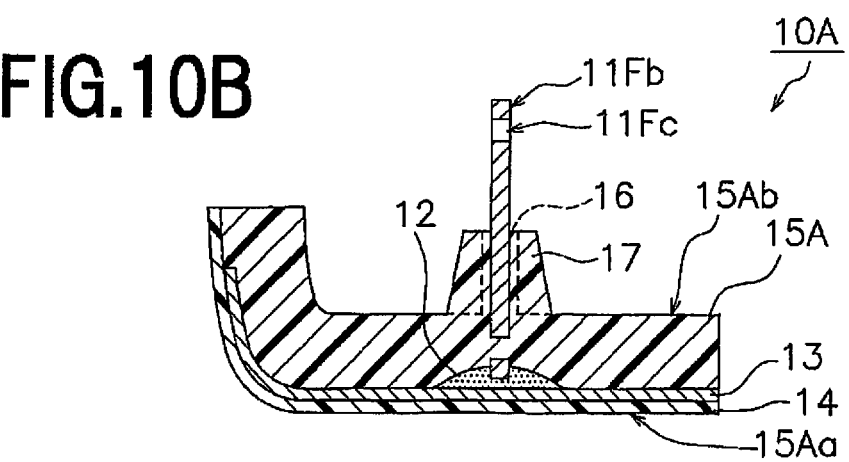
FIG. 10B is a cross sectional view taken along line III-III in FIG. 8.

Next, a composite molding according to a second embodiment of the present invention will be explained, with reference to FIG. 8 through FIG. 10C. FIG. 8 shows a composite molding 10A according to the second embodiment, and FIG. 9A shows a contact pin 11F that is used in the composite molding 10A. FIG. 10A is a cross section taken along line II-II in FIG. 8, and FIG. 10B is a cross section taken along line III-III. The points in which the composite molding 10A according to the second embodiment and the composite molding 10 according to the first embodiment differ are that the contact pin 11F has a flat plate shape that extends in a strip shape and that the perimeter of the contact pin 11F has a support protruding part 16 and ribs 17. The composite molding 10A according to the second embodiment shares the basic configuration with the composite molding 10 of the first embodiment, and consequently the composite molding 10A will be explained focusing on the configuration that differs from that of the composite molding 10. The contact pin 11F has a flat plate shape that extends in a strip shape, that is, a rectangular parallelepiped, and an opening 11Fc is formed at one end 11Fa thereof.

In the state wherein the one end 11Fa of the contact pin 11F contacts the electrically conductive bonding agent 12, the opening 11Fc of the contact pin 11F is buried within the molded body 15A, and the resin enters into the opening 11Fc. The contact pin 11F extends in an orientation in which it is orthogonal to the transfer layer 14, and the other end 11Fb is stuck out from the molded body 15A. The support protruding part 16, which rises up from a rear surface 15Ab of the molded body 15A to a prescribed height, is formed at the outer perimeter of the contact pin 11F. The support protruding part 16 is a reinforcing member that is integrally formed with the molded body 15A and that reinforces the support of the contact pin 11F. Furthermore, the support protruding part 16 shown in FIG. 8 is formed, in a plan view, in a ring shape along the outer perimeter of the contact pin 11F, but there may be a portion in which, in a plan view, the support protruding part 16 is partly not formed, such as in a C shape, as long as it is a shape that increases the fixedness of the contact pin 11F.

The ribs 17 are joined to the long edge sides of the support protruding part 16 in a plan view. The ribs 17 extend in an orientation orthogonal to these long edges of the support protruding part 16. As shown in FIG. 10B, each of the ribs 17 extends from the rear surface 15Ab of the molded body 15A to the upper surface of the support protruding part 16 and exhibits a trapezoidal shape whose width becomes narrower the further up it goes. The ribs 17 are reinforcing members that are integrally formed with the molded body 15A and reinforce the support of the contact pin 11F.

In the contact pin 11F shown in FIG. 10A, the openings 11Fc are formed at both ends of the contact pin 11F, that is, on the one end 11Fa side and on the other end 11Fb side, but the opening 11Fc may be not formed on the other end 11Fb side. However, if the two openings 11Fc are formed such that they have up-down symmetry with respect to the contact pin 11F, then either end of the contact pin 11F may be buried in an inner part of the molded body 15A and the manufacture of the composite molding 10A becomes easy.

Figure 10C:
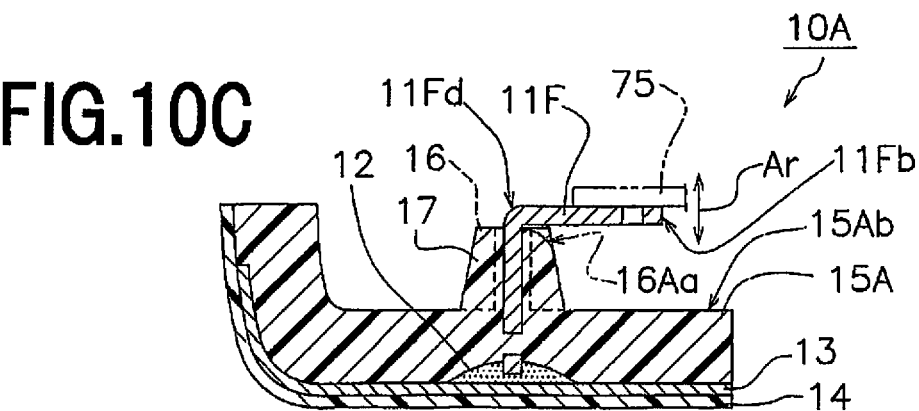
FIG. 10C is a cross sectional view for explaining a state wherein fabrication has been further performed from the state in FIG. 10B.

In addition, as shown in FIG. 10C, a spring characteristic may be imparted to the contact pin 11F by bending the contact pin 11F using the support protruding part 16 as the origin. In this case, the folded portion becomes a spring part 11Fd that exhibits spring characteristics. The spring part 11Fd makes it easy to create a bias in the directions of the arrow Ar, and thereby the electrical connection with a contact terminal 75 of a circuit board connected to the contact pin 11F is stabilized. In this case, examples of materials of the contact pin 11F are phosphor bronze, a copper nickel alloy, beryllium copper, a copper titanium alloy, and the like.

Furthermore, if the support protruding part 16 is formed such that it has an upper surface 16Aa with a curved surface shape, as indicated by a chain double dashed line, then the contact pin 11F can be bent smoothly. If the contact pin 11F is bent using the support protruding part 16 as the origin, then the height of the support protruding part 16 should be set to the position at which it is desired that the contact pin 11F fold.

(5) Structural Member
(5-1) Contact Pin

The contact pin 11F shown in FIG. 8 is formed of an electrically conductive material similar to that of the contact pin 11. For example, a pin that has a plate thickness t of 0.1-1 mm and a plate width W of 1-10 mm is used as the contact pin 11F. Preferably, the plate thickness t of the contact pin 11F is 0.15-0.5 mm, and the plate width W is 2-4 mm. If the plate thickness t is too thin, then undesirable deformation tends to occur, such as the contact pin 11F being bent by the pressure of the resin melt during the injection molding of the molded body 15A; if the plate thickness t is too thick, then the portion of a front surface 15Aa of the molded body 15A at which the contact pin 11F is disposed will tend to warp and become a disadvantage from the viewpoint of design; and if there is a secondary fabrication that bends the tip or the like of the contact pin, then difficulty will arise in the fabrication in which the bending will be difficult to implement. If the plate width W is too narrow, then the strength of the contact pin 11F will weaken and the contact pin 11F will tend to bend; and if the plate width W is too wide, then the contact pin 11F will likewise tend to deform owing to the application of the large amount of pressure of the resin melt during injection molding. The size of the contact pin 11F is appropriately selected in accordance with the application of the composite molding 10A, such as a smart phone, a tablet type personal computer, or the like.

The shape of the contact pin 11F used in the second embodiment may be, other than the one shown in FIG. 9A, the ones shown in, for example, FIG. 9B, FIG. 9C, and FIG. 9D. A contact pin 11G shown in FIG. 9B likewise has a flat plate shape that extends in a strip shape, the same as in the contact pin 11F, and is formed of a material similar to that of the contact pin 11F. The point in which the contact pin 11G differs from the contact pin 11F is that, instead of the openings 11Fc, triangular notches 11Gc are formed such that the plate width narrows. The contact pine 11G has a one end 11Ga and the other end 11Gb. Two of the four notches 11Gc of the contact pin 11G are provided at positions that are buried in the molded body 15A.

A contact pin 11H shown in FIG. 9C likewise has a flat plate shape that extends in a strip shape, the same as in the contact pin 11F, and is formed of a material similar to that of the contact pin 11F. The point in which the contact pin 11H differs from the contact pin 11F is that, instead of the openings 11Fc, trapezoidal notches 11Hc are provided at center parts of a one end 11Ha and the other end 11Hb. Because the notch 11Hc has a trapezoidal shape, its width narrows toward the end edges. One of the two notches 11He of the contact pin 11H is buried in the molded body 15A.

A contact pin 11I shown in FIG. 9D likewise has a flat plate shape that extends in a strip shape, the same as in the contact pin 11F, and is formed of a material similar to that of the contact pin 11F. The point in which the contact pin 11I differs from the contact pin 11F is that a one end 11Ia and the other end 11Ib are fabricated in tapered shapes. The tapered shapes of the one end 11Ia and the other end 11Ib make it easy to insert the film and make it easy for there to be movement within the mold.

Furthermore, although the contact pins 11F, 11G, 11H, 11I shown in FIG. 9A through FIG. 9D have the openings 11Fc, 11Ic, the notches 11Gc, 11Hc, and the like buried in the molded body 15A, their quantities, shapes, sizes, arrangement positions, and the like are not limited to the examples shown in FIG. 9A through FIG. 9D. The contact pin preferably has a shape such that it tends not to come out even if pulled and tends not to pierce the front surface 15a side of the molded body 15A even if pushed.

<Third Embodiment>
(6) Overview of Composite Molding

In the composite moldings 10, 10A according to the abovementioned first embodiment and second embodiment, the contact pins 11, 11F are exposed on the side opposite the electrode pattern layer 13, the transfer layer 14, and the like. However, the direction in which the contact pin is exposed may be on the side opposite the composite moldings 10, 10A. For example, a configuration may be adopted such that the contact pin pierces through the electrode pattern layer 13.

Figure 11:
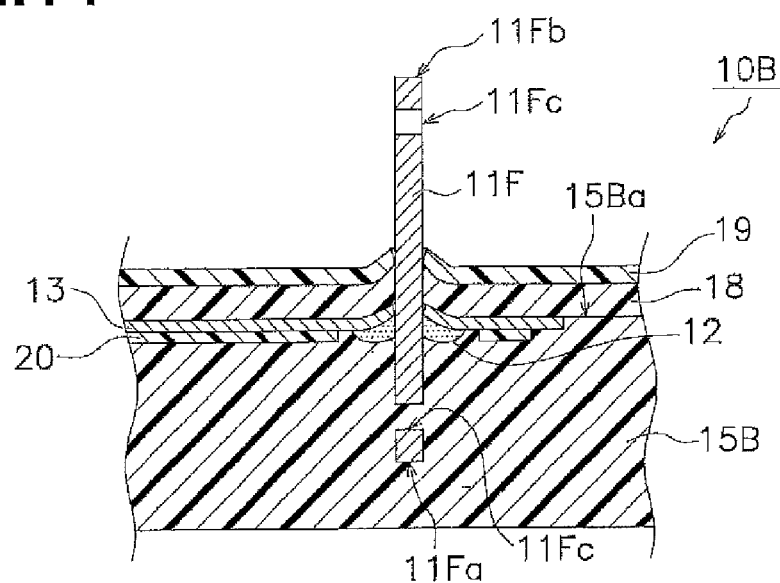
FIG. 11 is a partial cross sectional view that shows one example of a configuration of the composite molding according to a third embodiment.

A composite molding 10B according to the third embodiment shown in FIG. 11 is configured such that the contact pin 11F pierces through the electrode pattern layer 13. In the contact pin 11F shown in FIG. 11, as was explained with reference to FIG. 10A, the openings 11Fc are formed in the one end 11Fa and the other end 11Fb.

The other end 11Fb of the contact pin 11F pierces through not only the electrode pattern layer 13 but also the electrically conductive bonding agent 12, the base film 18, and a design ink layer 19, and is stuck out from a molded body 15B. Moreover, the one end 11Fa of the contact pin 11F is buried within the molded body 15B, the same as in the composite moldings 10, 10A of the first embodiment, the second embodiment, and so on.

In addition, the point in which the composite molding 10B of the third embodiment differs from the composite moldings 10, 10A of the first embodiment, the second embodiment, and so on is that a front surface 15Ba of the molded body 15B is covered by the base film 18 and the design ink layer 19. The composite molding 10B comprises the base film 18 and the design ink layer 19 instead of the transfer layer 14 of the composite moldings 10, 10A, and therefore the methods of manufacturing the composite molding 10, 10A and the composite molding 10B differ and the method of manufacturing the composite molding 10B will be discussed later.

Figure 12A:
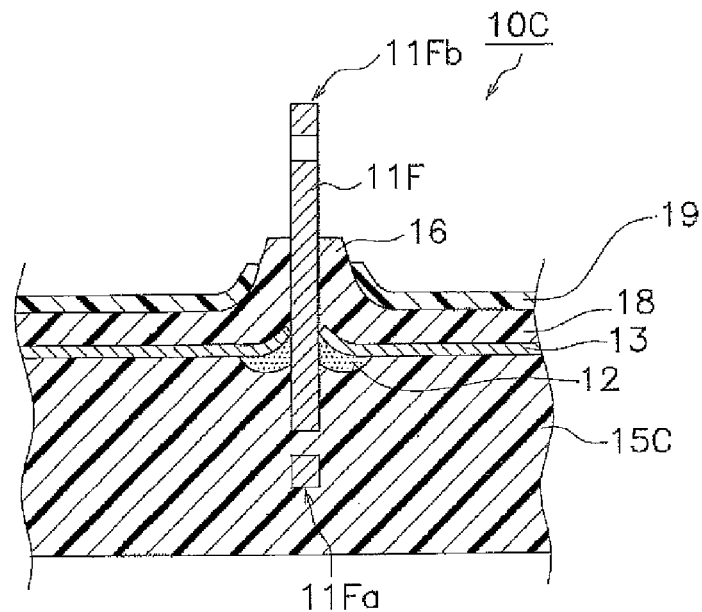
FIG. 12A is a partial cross sectional view that shows another embodiment of the configuration of the composite molding according to the third embodiment.

Furthermore, the composite molding 10B differs from the composite moldings 10, 10A also in that the composite molding 10B comprises a adhesive layer 20 between the molded body 15B and the electrode pattern layer 13. However, if the base film 18 and the electrode pattern layer 13 have thermobonding characteristics with respect to the molded body resin, then the adhesive layer 20 of the composite molding 10B may be omitted; and if the electrode pattern layer 13 and the transfer layer 14 in the previously explained composite moldings 10, 10A have poor thermobonding characteristics with respect to the molded body resin, then a adhesive layer may be provided. In addition, as shown in FIG. 12A, the support protruding part 16 can also be provided on a molded body 15C of a composite molding 10C, the same as in the composite molding 10A of the second embodiment. Because the contact pin 11F of the composite molding 10C has a flat plate shape, the support protruding part 16 in a plan view surrounds the outer perimeter of the contact pin 11F in a ring shape, the same as in the support protruding part 16 of the second embodiment. Furthermore, in the composite molding 10C shown in FIG. 12A, the adhesive layer 20, which was provided in the composite molding 10B, is omitted.

Figure 12B:
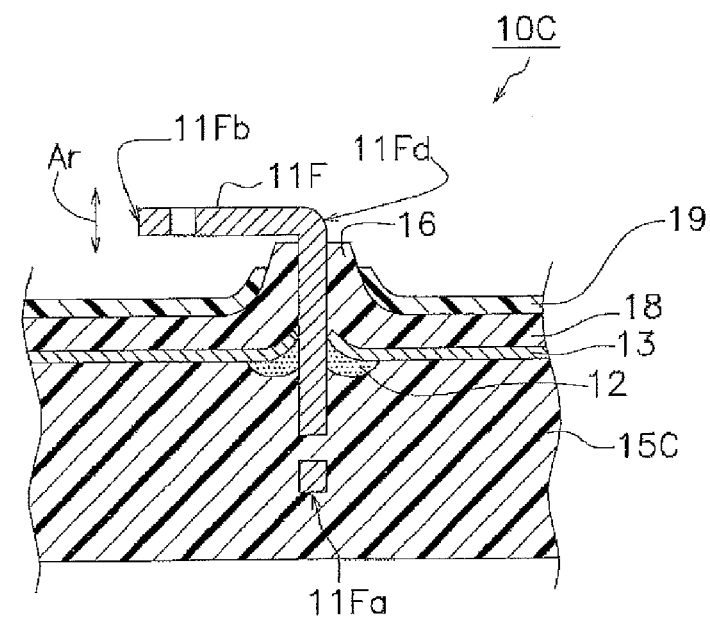
FIG. 12B is a partial cross sectional view that shows a modified example of another embodiment of the configuration of the composite molding according to the third embodiment.

In addition, as shown in FIG. 12B, the contact pin 11F may be bent using the support protruding part 16 as the origin to impart a spring characteristic to the contact pin 11F. In this case, the folded portion becomes the spring part 11Fd, which exhibits the spring characteristic. The spring part 11Fd makes it easy to create a bias in the directions of the arrow Ar, and thereby the electrical connection with the circuit board connected to the contact pin 11F is stabilized.

Figure 13:
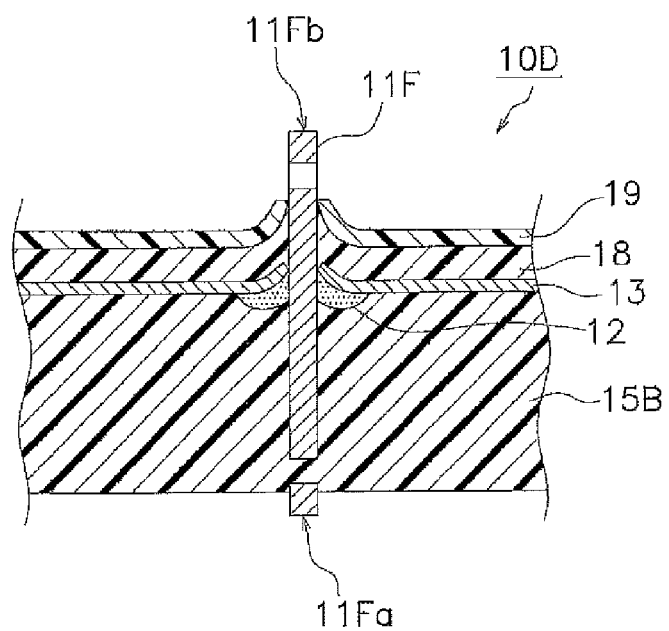
FIG. 13 is a partial cross sectional view that shows yet another embodiment of the configuration of the composite molding according to the third embodiment.

Furthermore, as in a composite molding 10D shown in FIG. 13, it is also possible to adopt a configuration wherein the one end 11Fa of the contact pin 11F is also exposed to the outer part of the molded body 15B. If configured in this manner, the electrical connection to the electrode pattern layer 13 can be made from the one end 11Fa as well as from the other end 11Fb of the contact pin 11F.

(7) Structural Members

Of the structural members that constitute the composite molding 10B, the contact pin 11F, the electrically conductive bonding agent 12, the electrode pattern layer 13, and the molded body 15B are the same as the contact pin 11, the electrically conductive bonding agent 12, the electrode pattern layer 13, and the molded body 15 of the composite molding 10, and consequently explanation thereof is omitted.

(7-1) Base Film

The base film 18 of the composite molding 10B can be configured with a material the same as that of the base film 30 described above. As the base film 18, it is possible to use a film whose thickness is, for example, 25-200 µm.

7-2) Design Ink Layer

The design ink layer 19 is a layer for expressing a design, such as a pattern. The design ink layer 19 can be formed by, for example, gravure, a screen printing method, or the like on the base film 18. The material with which the design ink layer 19 is formed contains, for example: a resin, such as an acrylic based resin, a vinyl chloride/vinyl acetate copolymer resin, a thermoplastic urethane based resin, a polyester based resin, or the like; and a pigment or a dye added thereto. In addition, the design ink layer 19 can also be a metal thin film layer using, for example, a vacuum evaporating method, sputtering, or the like. If a metal thin film is used as the design ink layer 19, then a pattern can be formed using an etching method. If the design ink layer 19 requires a metallic tone design, then an aluminum paste, mirror ink, or the like that has been subject to an insulating treatment can be used on the front surface. A topcoat layer similar to the transfer layer 14 may be formed on the design ink layer 19.

(7-3) Adhesive Layer

For example, a thermoplastic resin, such as a urethane based resin, a polyester based resin, a synthetic rubber based resin, a polyamide based resin, or an acrylic based resin, or a vinyl chloride/vinyl acetate copolymer resin can be used for the insulative adhesive layer 20. Owing to the heat of the resin melt, the adhesive layer 20 expresses adhesiveness, which improves the bonding strength between the molded body 15B and the electrode pattern layer 13. The thickness of the adhesive layer 20 is, for example, approximately 2-20 µm.

(8) Molded Resin Sheet

Figure 14:
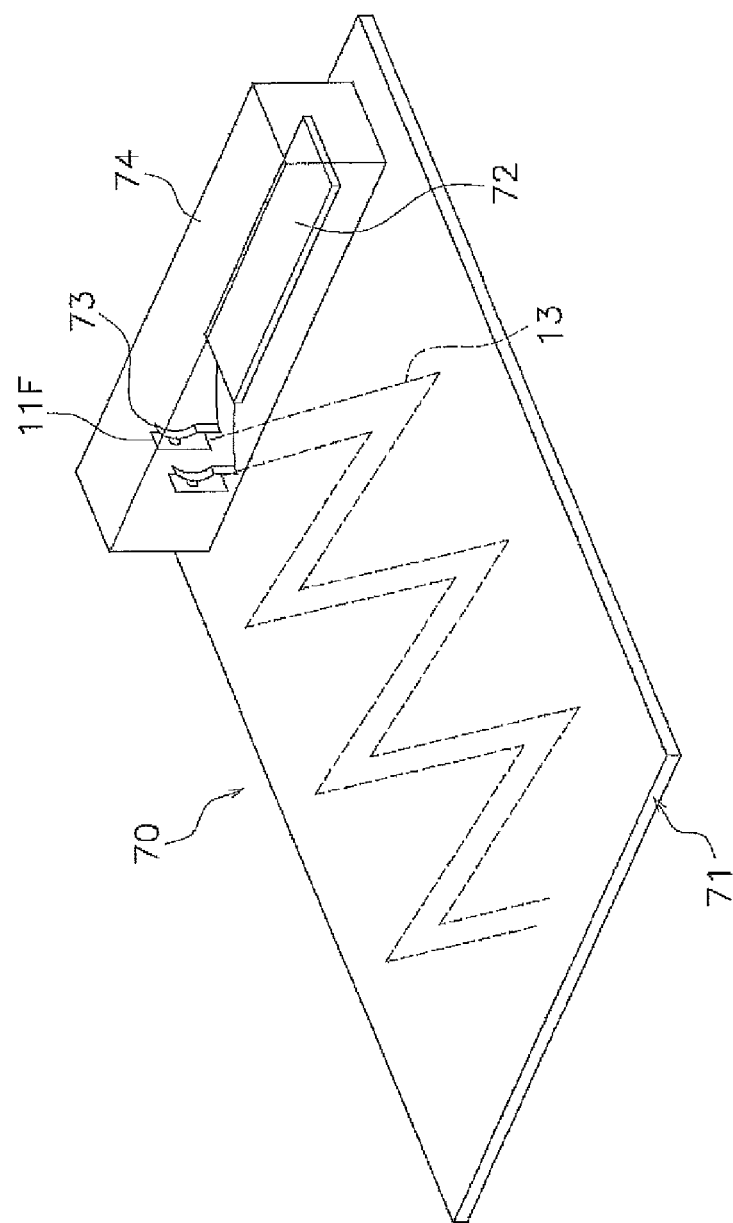
FIG. 14 is an oblique view for explaining a molded resin sheet, which is one example of an application of the composite molding.

FIG. 14 shows a molded resin sheet 70 as one example of an application of the composite molding 10B. In the molded resin sheet 70, the electrode pattern layers 13 and the contact pins 11F are integrally formed with a resin sheet 71. Ones similar to the base film 18, the design ink layer 19, and the like of the composite molding 10B are disposed on the front surface of the resin sheet 71.

Contact terminals 73 electrically connected with a circuit board 72 are disposed such that they contact the contact pins 11F. The circuit board 72 and the contact terminals 73 are housed in a circuit board cover 74 and positioned in an inner part of the circuit board cover 74. Consequently, when the circuit board cover 74, wherein the circuit board 72 and the contact terminals 73 are housed, is attached to the molded resin sheet 70, the circuit board 72 and the electrode pattern layers 13 are connected via the contact pins 11F and the contact terminals 73. An example that can be given of an application of the molded resin sheet 70 of this type is an application wherein, when a portable telephone or the like is placed on the molded resin sheet 70, the portable telephone or the like is contactlessly charged via the electrode pattern layers 13.

(9) Composite Molding Manufacturing Method

Figure 15:
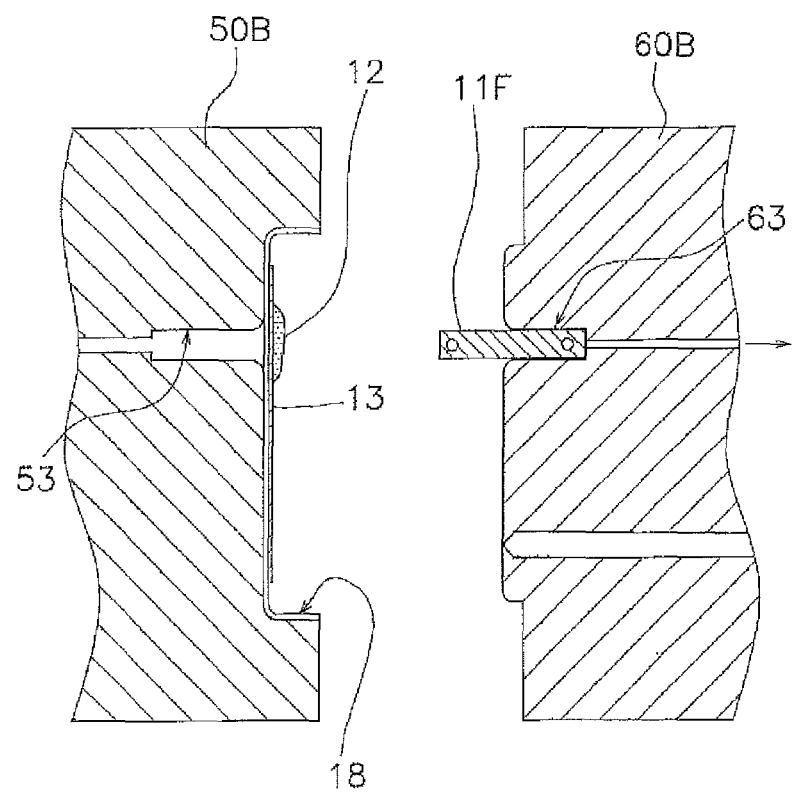
FIG. 15 is a cross sectional view that shows an insert molding disposing process according to the third embodiment.

One example of a method of manufacturing the composite molding 10B will be explained, with reference to FIG. 15 through FIG. 19. FIG. 15 shows a disposing process. In the disposing process, the base film 18 having the electrode pattern layer 13, to which the electrically conductive bonding agent 12 has been applied, is disposed on the inner surface 51 of a first mold 50B. The base film 18 is sucked to and thereby fixed to the inner surface 51 of the first mold 50B. The electrically conductive bonding agent 12 is disposed at the portion that overlaps the position at which a contact pin receiving part 53 is disposed. Moreover, the contact pin 11F is disposed in a contact pin insertion part 63 of a second mold 60B. The contact pin 11F is sucked by air during mounting and is thereby fixed to the contact pin insertion part 63.

Figure 16:
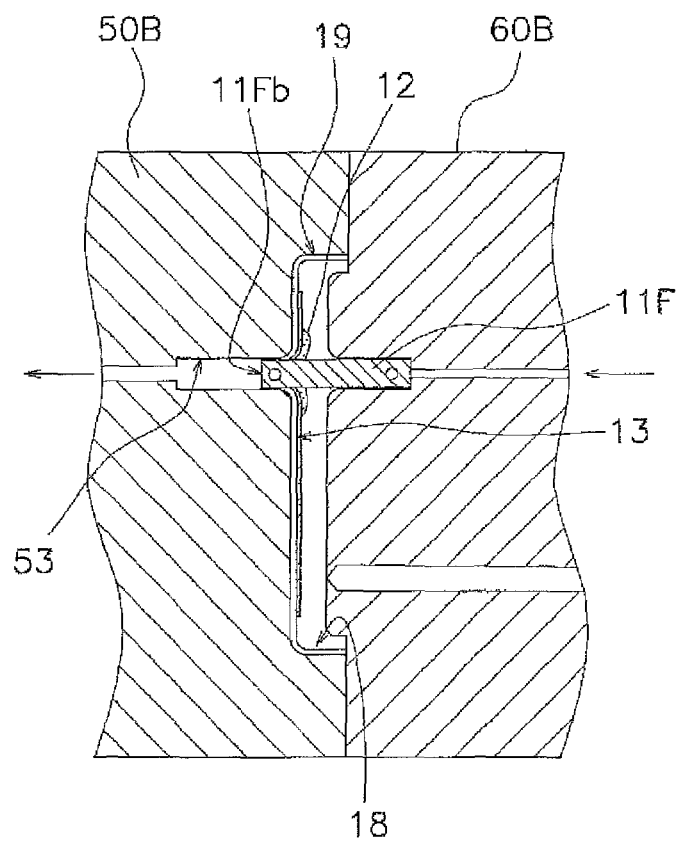
FIG. 16 is a cross sectional view that shows the insert molding mold clamping process according to the third embodiment.

Next, the mold clamping process shown in FIG. 16 is performed. In the mold clamping process, the contact pin 11F, which is disposed in the inner surface 61 of the second mold 60B, pierces through the electrically conductive bonding agent 12, the electrode pattern layer 13, the base film 18, and the design ink layer 19, which are disposed in the first mold 50B. Furthermore, the other end 11Fb of the contact pin 11F is caused to ingress into an inner part of the contact pin receiving part 53 of the first mold 50B.

Figure 17:
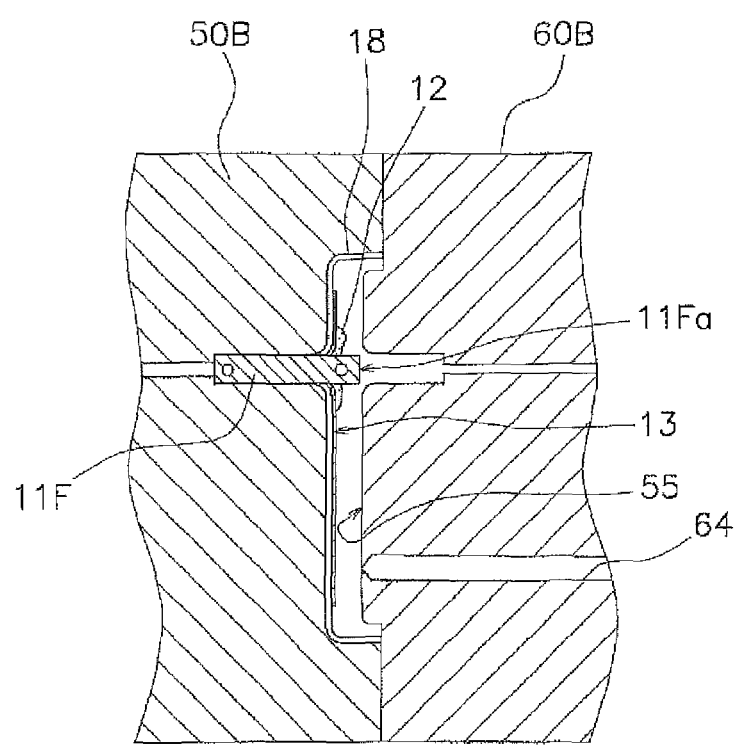
FIG. 17 is a cross sectional view that shows the insert molding mold clamping process according to the third embodiment.
Figure 18:
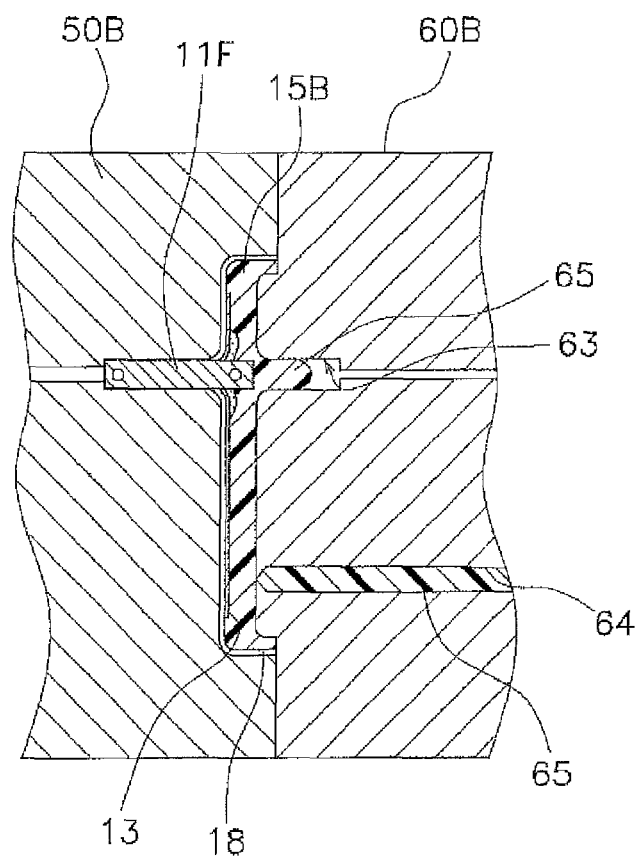
FIG. 18 is a cross sectional view that shows the insert molding injecting process according to the third embodiment.

During the mold clamping as shown in FIG. 17, the contact pin 11F is further sucked as far as a prescribed position of the contact pin receiving part 53 and thereby fixed thereto. At this time, instead of the contact pin 11 being sucked into the contact pin receiving part 53, compressed air may be blown into the contact pin insertion part 63, thereby pushing up the contact pin 11. Alternatively, compressed air may be blown into the contact pin insertion part 63 while suction is being performed on the contact pin receiving part 53 side, and both forces may cause the contact pin 11F to move to the prescribed position of the contact pin receiving part 53. In so doing, the one end 11Fa of the fixed contact pin 11F is disposed in the vicinity of the center of the cavity part 55, which is formed between the first mold 50B and the second mold 60B. FIG. 18 shows an injecting process. In the injecting process, the resin melt 65 passes and is injected through the sprue 64 to the cavity part 55, which is formed between the first mold 50B and the second mold 60B. At this time, a gap is created in the contact pin insertion part 63, and the resin melt 65 flows into that gap. The resin melt 65 bonds tightly to the front surfaces of the contact pin 11F and the electrically conductive bonding agent 12; in the electrically conductive bonding agent 12, the binder softens owing to the heat directly transferred from the resin melt 65 and the heat transferred via the contact pin 11F and thereby exhibits a bonding function. The electrically conductive bonding agent 12 bonds to the contact pin 11 in the state in which the bond with the electrode pattern layer 13 is maintained even if the binder softens, and thereby an electrical connection is formed between the electrode pattern layer 13 and the contact pin 11. At this time, the electrically conductive bonding agent 12, which surrounds the perimeter of the contact pin 11, bonds such that it covers the outer perimeter of the contact pin 11, thereby increasing the degree of adhesion with the contact pin 11.

Figure 19:
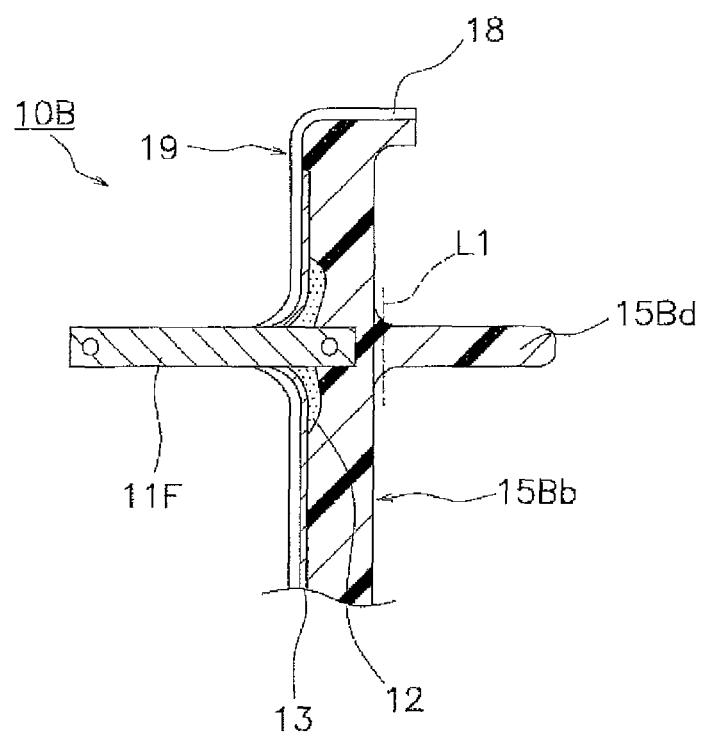
FIG. 19 is a partial cross sectional view for explaining a process of the removed composite molding.

When the resin melt 65 fills the cavity part 55 and the flow stops, the resin melt 65 is cooled via the first mold 50B and the second mold 60B. The resin melt 65 is cooled and solidifies, and thereby the molded body 15B is formed. Next, mold opening of the first mold 50B and the second mold 60B is performed. In the removed composite molding 10B, a flash 15Bd as shown in FIG. 19 has been created owing to the resin melt 65 flowing into the contact pin insertion part 63, and consequently this flash 15Bd is cut of at a line L1 after molding.

Figure 20A:
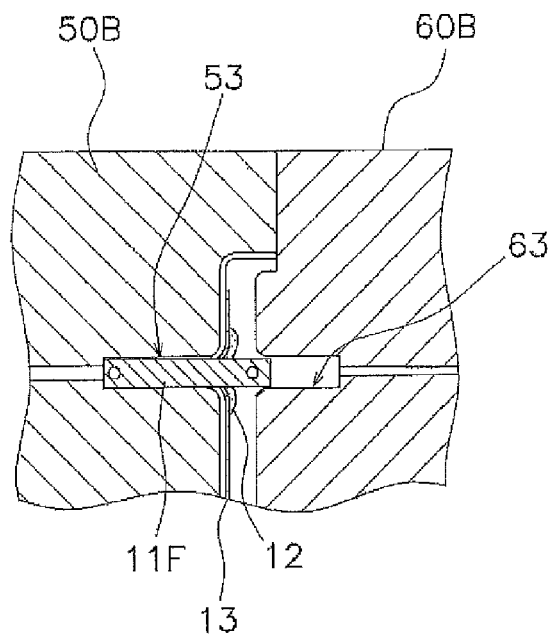
FIG. 20A is a cross sectional view that shows another insert molding mold clamping process according to the third embodiment.

In a manufacturing process, to make it such that the flash 15Bd is not formed, for example, as shown in FIG. 20A, the one end 11Fa is disposed, in the state wherein the contact pin 11F is fixed at a prescribed position of the contact pin receiving part 53, such that it remains in the contact pin insertion part 63. The one end 11Fa side of the contact pin 11F plugs up the contact pin insertion part 63, and thereby the resin melt 65 no longer flows into the contact pin insertion part 63 in the injecting process. However, as shown in FIG. 21A, in the composite molding 10D manufactured in this manner, not only is the other end 11Fb of the contact pin 11F exposed, but the one end 11Fa is also stuck out from a rear surface 15Bb of the molded body 15B.

Figure 20B:
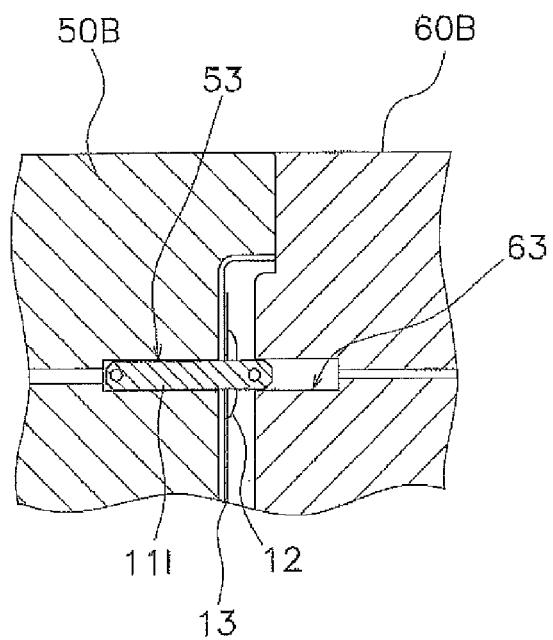
FIG. 20B is a cross sectional view that shows the insert molding mold clamping process that uses a contact pin of yet another shape.
Figure 21A:
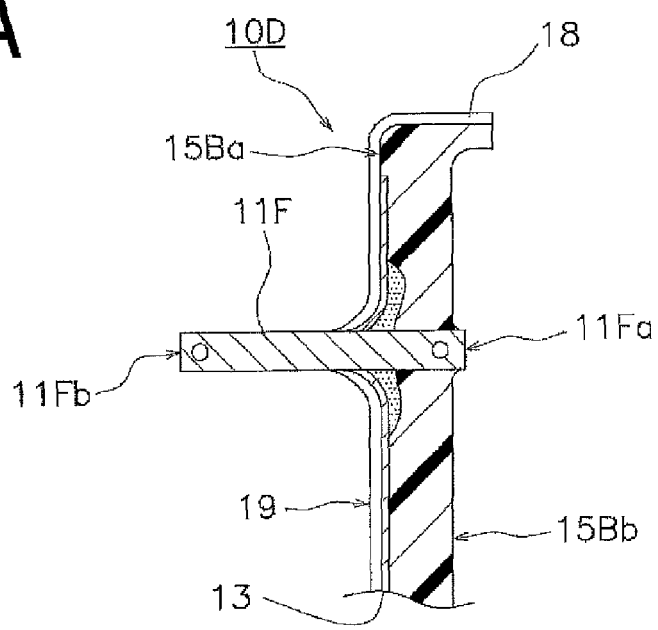
FIG. 21A is a partial enlarged cross sectional view that shows one example of the composite molding formed by another insert molding according to the third embodiment.
Figure 21B:
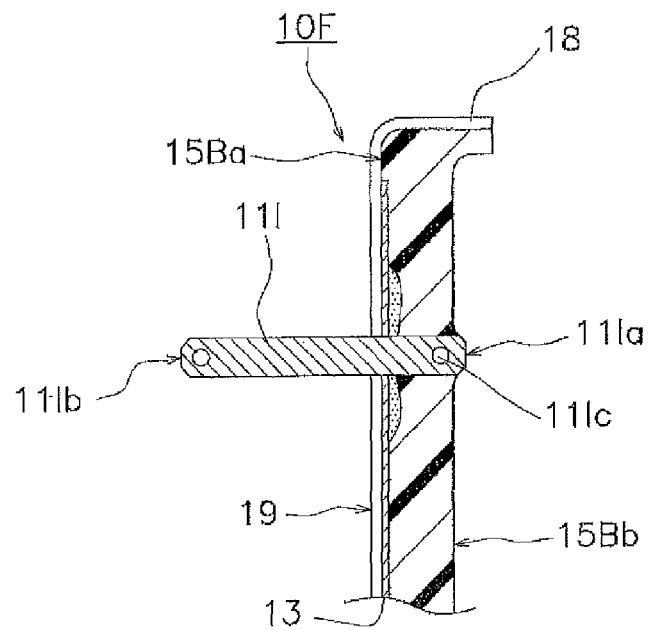
FIG. 21B is a partial enlarged cross sectional view that shows another example of the composite molding using a contact pin of yet another shape.

The processes shown in FIG. 20A and FIG. 21A can also be performed, as shown in FIG. 20B and FIG. 21B, by fabricating the one end 11Ia shown in FIG. 9D into a tapered shape and using the contact pin 11I wherein the one end 11Ia assumes a C plane. In this case, it is possible to make it such that the part along the perimeter of the contact pin receiving part 53 of the first mold 50B is not created. Thereby, in a composite molding 10F manufactured using the contact pin 11I, the perimeter of the contact pin 11I can be formed flatly.

Figure 22:
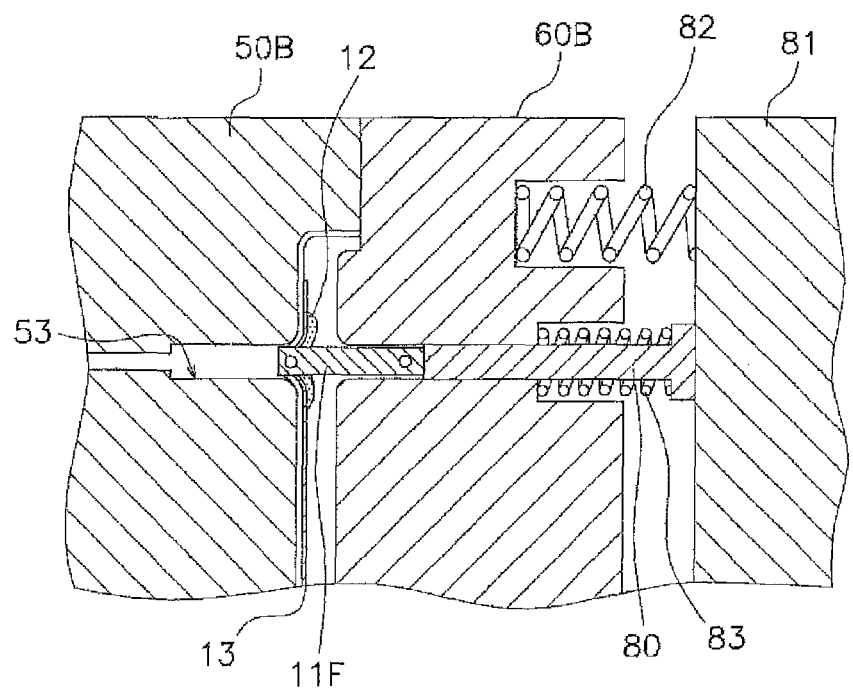
FIG. 22 is a cross sectional view that shows another mold clamping process for the insert molding according to the third embodiment.
Figure 23:
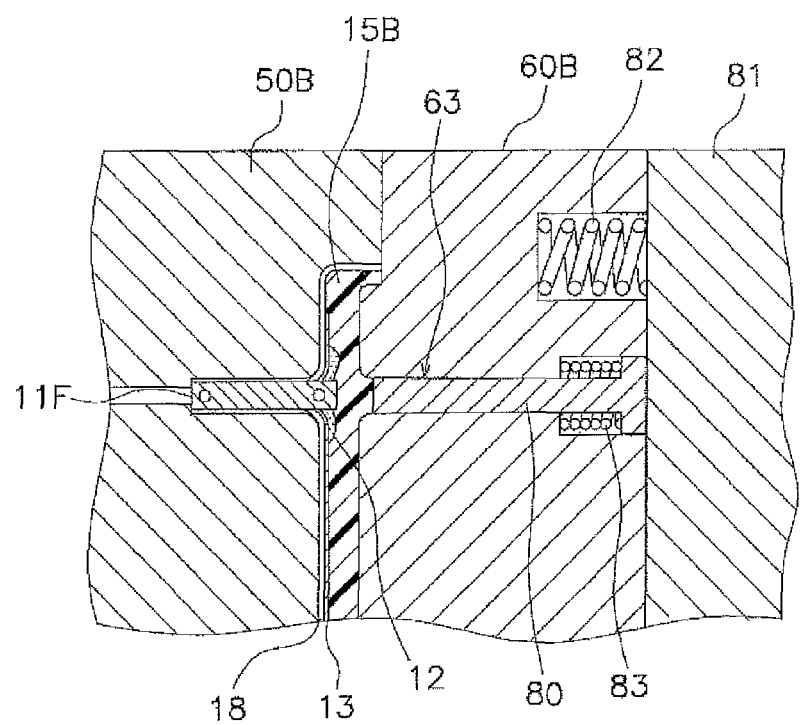
FIG. 23 is a cross sectional view that shows another injecting process for the insert molding according to the third embodiment.

In the manufacturing process, to make it such that the flash 15Bd is not formed, for example, as shown in FIG. 22 and FIG. 23, a drive pin 80 plugs up the contact pin insertion part 63 in the state wherein the contact pin 11F is fixed at a prescribed position of the contact pin receiving part 53, and thereby the resin melt 65 no longer flows into the contact pin insertion part 63 in the injecting process. As shown in FIG. 23, until the mold is clamped and a plate 81 is pressed against the second mold 60B, the plate 81, to which the drive pin 80 is attached, is spaced apart from the second mold 60B by springs 82, 83. At this time, the spring 83 presses an end of the drive pin 80 against the plate 81, and consequently the drive pin 80 is drawn into the back of the contact pin insertion part 63 and thereby the contact pin 11F is housed in the contact pin insertion part 63. As shown in FIG. 23, when the plate 81 is pushed, opposing the elastic forces of the springs 82, 83, against the second mold 60B, the drive pin 80 is inserted into the contact pin insertion part 63 and the contact pin 11 is pushed out by the drive pin 80. At the same time, the contact pin 11F is sucked into the contact pin receiving part 53 and the contact pin 11F is fixed at a prescribed position of the contact pin receiving part 53.

<Fourth Embodiment>

(10) Overview of Composite Molding

Figure 29:
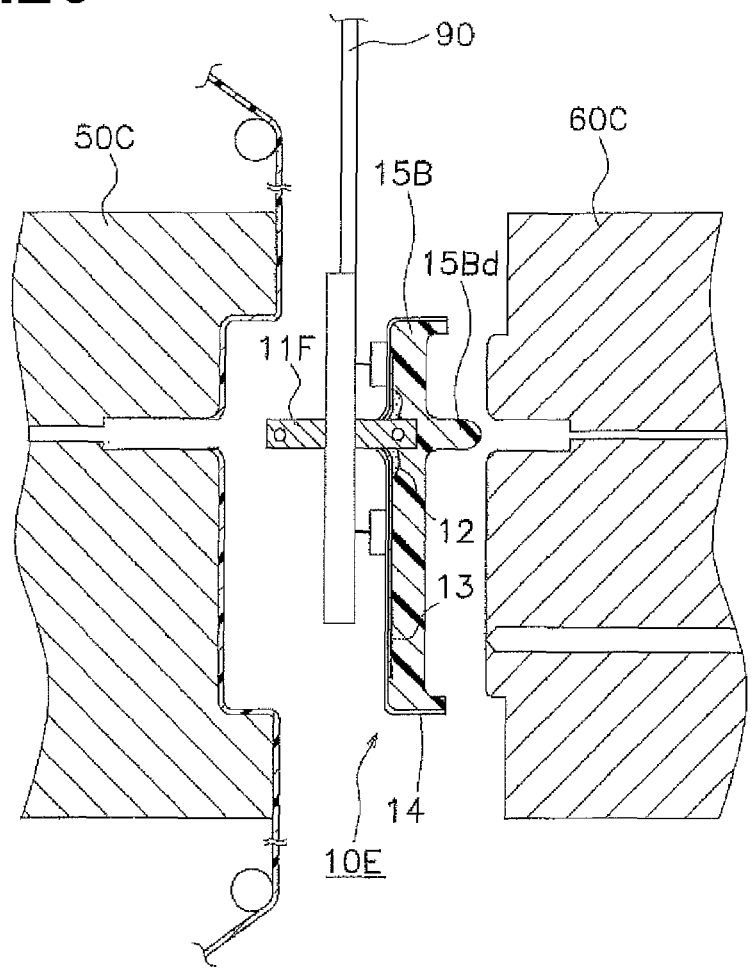
FIG. 29 is a cross sectional view that shows a removing process for the injection molding in-mold decoration according to the fourth embodiment.

In the composite molding 10B according to the third embodiment described above, the contact pin 11F pierces through the electrically conductive bonding agent 12, the electrode pattern layer 13, the base film 18, and the design ink layer 19, and the other end 11Fb of the contact pin 11F is stuck out from the molded body 15B. In contrast, in a composite molding 10E according to the fourth embodiment as shown in FIG. 29, the contact pin 11F pierces through the electrically conductive bonding agent 12, the electrode pattern layer 13, and the transfer layer 14, and the other end 11Fb of the contact pin 11F is stuck out from the molded body 15B. Moreover, the one end 11Fa of the contact pin 11F is buried in the molded body 15B, the same as in the composite molding 10B of the third embodiment. Thus, the only point of difference between the composite molding 10E of the fourth embodiment and the composite molding 10 of the first embodiment is the direction in which the contact pin 11F pierces through. In other words, thus, the point in which the composite molding 10E of the fourth embodiment differs from the composite molding 10B of the third embodiment is that the front surface 15Ba of the molded body 15B is covered by the transfer layer 14 instead of by the base film 18 and the design ink layer 19. The transfer layer 14 is the same as the transfer layer 14 of the composite moldings 10, 10A of the first embodiment and the second embodiment. Consequently, the manufacturing method of the composite molding 10E of the fourth embodiment is the combination of the manufacturing method of the composite moldings 10, 10A of the first embodiment and the second embodiment and the manufacturing method of the composite molding 10B of the third embodiment.

(11) Composite Molding Manufacturing Method

Figure 24:
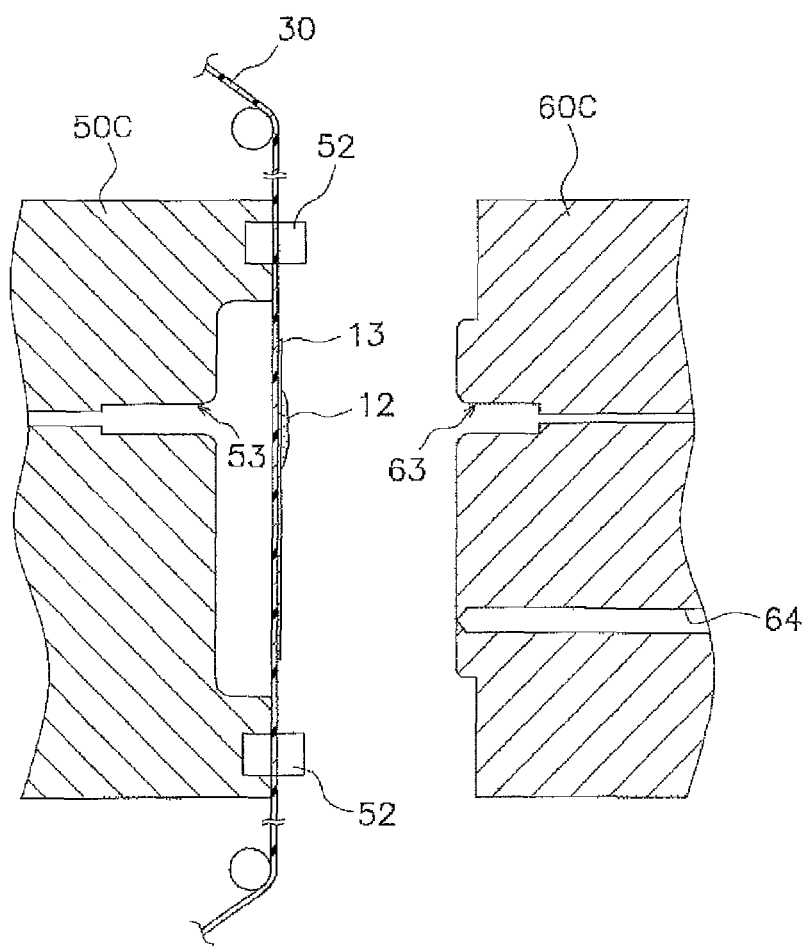
FIG. 24 is a cross sectional view that shows the disposing process for the injection molding in-mold decoration according to a fourth embodiment.
Figure 25:
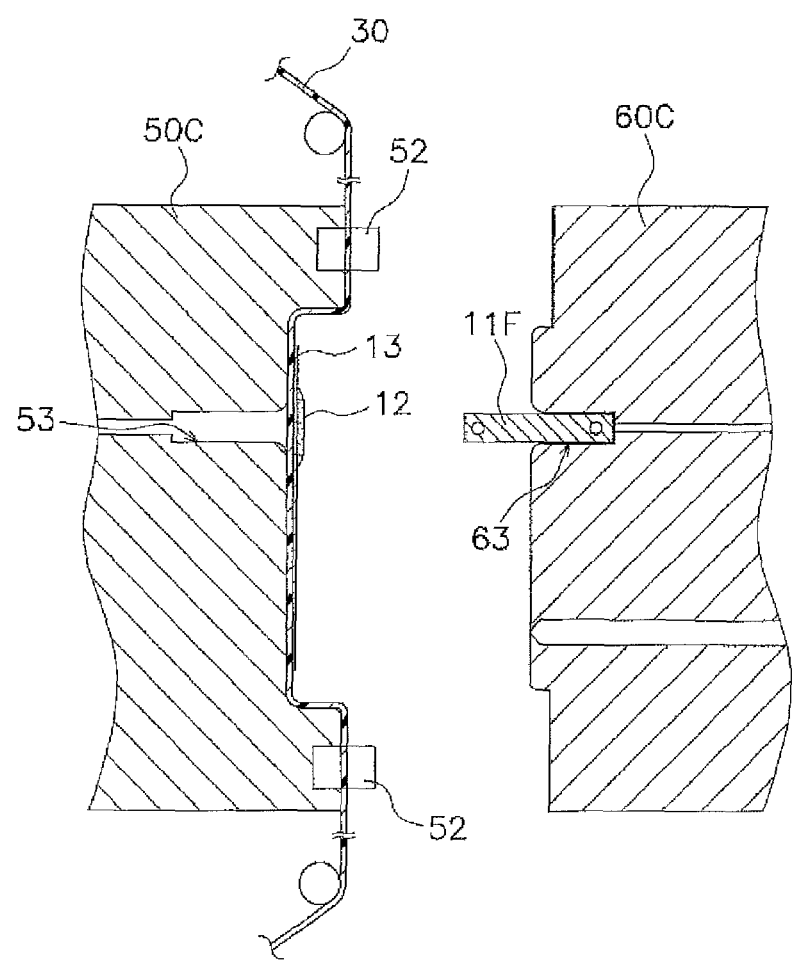
FIG. 25 is a cross sectional view that shows the disposing process for the injection molding in-mold decoration according to the fourth embodiment.

One example of a manufacturing method of the composite molding 10E will be explained, with reference to FIG. 24 to FIG. 28. FIG. 24 and FIG. 25 show a disposing process. In the disposing process, the base film 30, which has the electrode pattern layer 13, to which the electrically conductive bonding agent 12 has been applied, and the transfer layer 14, is disposed on the inner surface 51 of a first mold 50C. The base film 30 is fixed by the clamps 52 and is sucked to and thereby fixed to the inner surface 51 of the first mold 50C. The electrically conductive bonding agent 12 is disposed at a portion that overlaps the position at which the contact pin receiving part 53 is disposed. Moreover, the contact pin 11F is disposed in a second mold 60C. The contact pin 11F is sucked by air during mounting and thereby is fixed to the contact pin insertion part 63.

Figure 26:
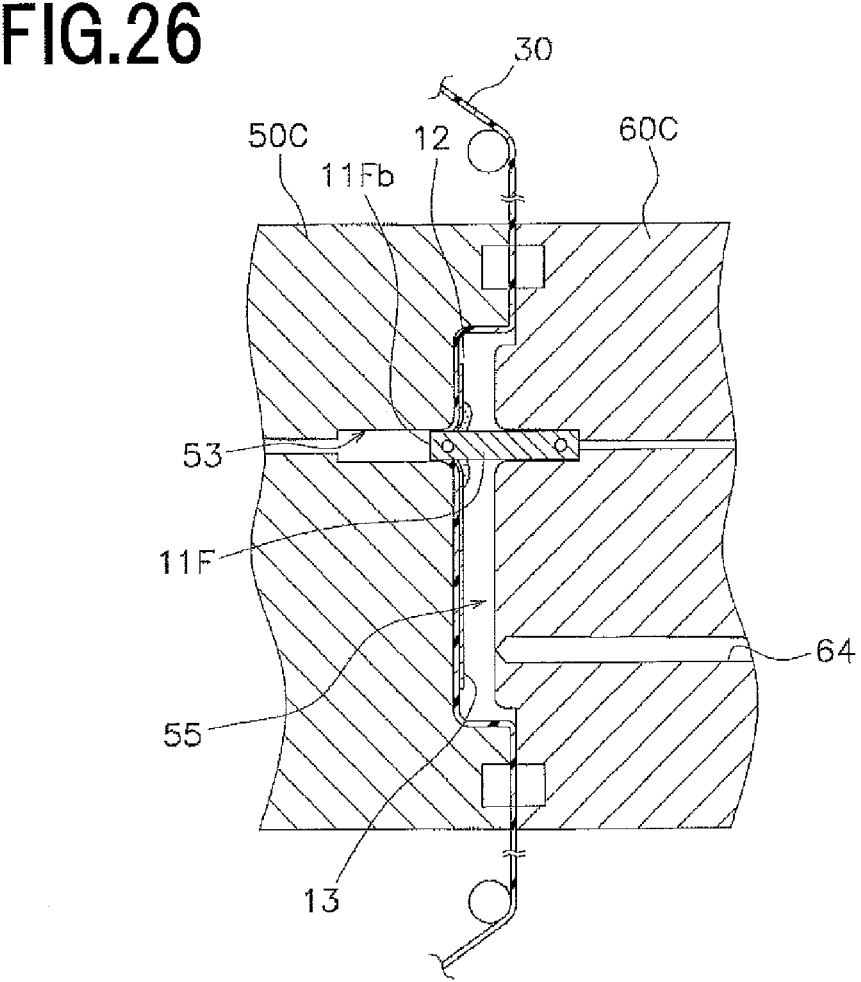
FIG. 26 is a cross sectional view that shows the mold clamping process for the injection molding in-mold decoration according to the fourth embodiment.

Next, a mold clamping process shown in FIG. 26 is performed. In the mold clamping process, the contact pin 11F, which is disposed in an inner surface 61 of the second mold 60C, pierces through the electrically conductive bonding agent 12, the electrode pattern layer 13, the transfer layer 14, and the base film 30, which are disposed in the first mold 50C. Furthermore, the other end 11Fb of the contact pin 11F is caused to ingress into an inner part of the contact pin receiving part 53 of the first mold 50C.

Figure 27:
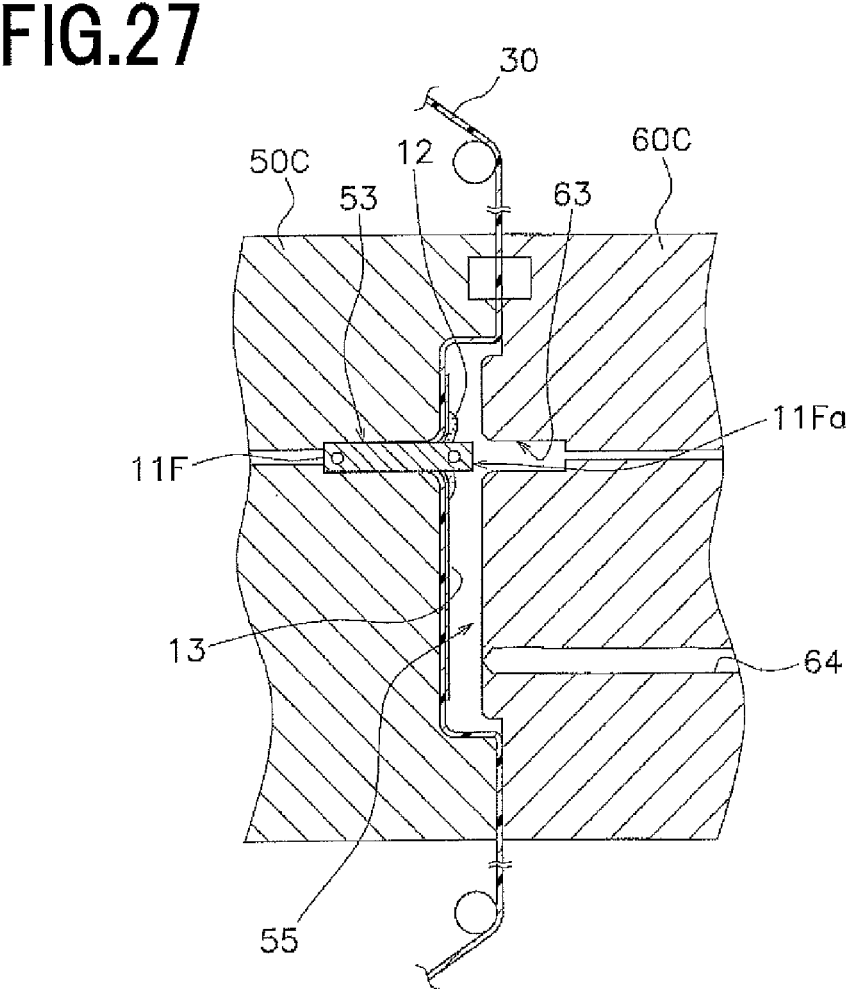
FIG. 27 is a cross sectional view that shows the mold clamping process for the injection molding in-mold decoration according to the fourth embodiment.

During the mold clamping as shown in FIG. 27, the contact pin 11F is further sucked to a prescribed position of the contact pin receiving part 53 and thereby fixed thereto.

Figure 28:
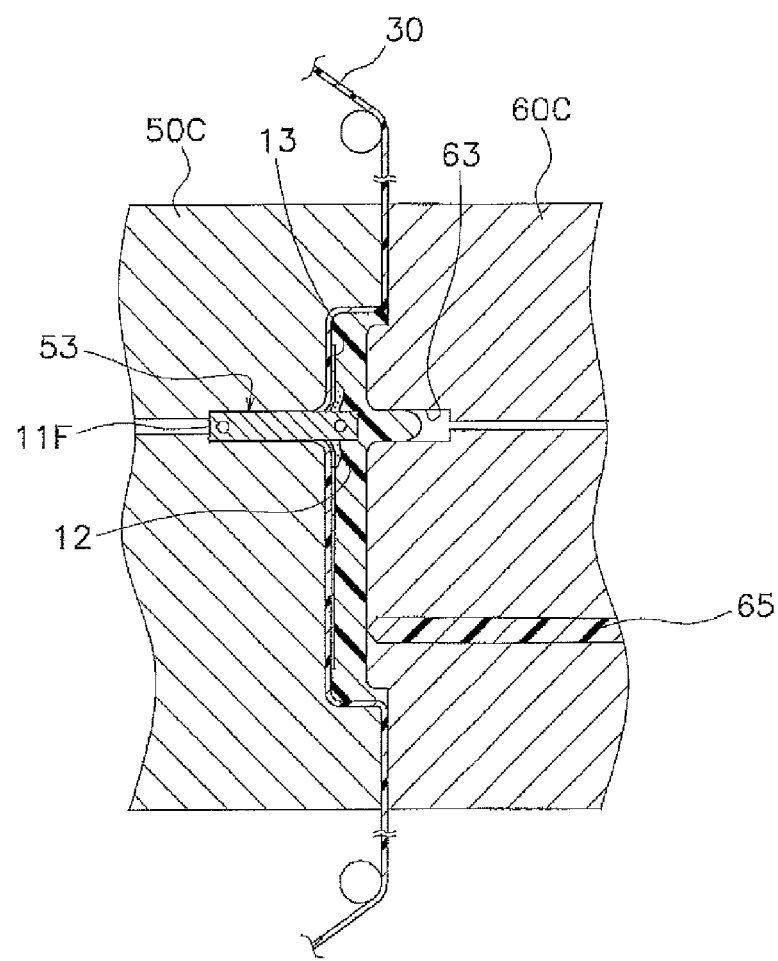
FIG. 28 is a cross sectional view that shows the injecting process for the injection molding in-mold decoration according to the fourth embodiment.

FIG. 28 shows an injecting process. In the injecting process, the resin melt 65 is injected through the sprue 64 to the cavity part 55 formed between the first mold 50C and the second mold 60C. At this time, a gap is created in the contact pin insertion part 63, and the resin melt 65 flows into that gap. The resin melt 65 bonds tightly to the front surfaces of the contact pin 11F and the electrically conductive bonding agent 12; furthermore, the binder of the electrically conductive bonding agent 12 softens by the heat directly transferred from the resin melt 65 and the heat transferred via the contact pin 11F, and thereby the electrically conductive bonding agent 12 exhibits a bonding function. The electrically conductive bonding agent 12 bonds to the contact pin 11F in the state in which the bond with the electrode pattern layer 13 is maintained even though the binder softens, thereby forming an electrical connection between the electrode pattern layer 13 and the contact pin 11F. At this time, the electrically conductive bonding agent 12, which surrounds the perimeter of the contact pin 11F, bonds such that it covers the outer perimeter of the contact pin 11F, thereby increasing the degree of adhesion with the contact pin 11F.

When the resin melt 65 fills the cavity part 55 and the flow stops, the resin melt 65 is cooled via the first mold 50C and the second mold 60C. The resin melt 65 is cooled and solidifies, and thereby the molded body 15B is formed.

Next, as shown in FIG. 29, mold opening of the first mold 50C and the second mold 60C is performed. At this time, the composite molding 10E remains in the second mold 60C and the base film 30 remains in the first mold 50C, and therefore the composite molding 10E is removed from the base film 30. The composite molding 10E is separated from the second mold 60C by, for example, an eject pin (not shown) that protrudes from the second mold 60C and is held by and removed by a removing robot 90 that has ingressed. In the removed composite molding 10E, the resin melt 65 has flowed into the contact pin insertion part 63 to create the flash 15Bd as shown in FIG. 28, and consequently this flash 15Bd is cut off after molding.

(12) Features (12-1)

As explained above, the molded bodies 15, 15A, 15B are molded by the injection molding of the thermoplastic resin into the shape (prescribed shape) of the cavity part 55, which is formed by the closing of the first molds 50, 50B, 50C and the second molds 60, 60B, 60C. The entire front surfaces 15a, 15Aa, 15Ba of the molded bodies 15, 15A, 15B of the first embodiment, the second embodiment, and the fourth embodiment are covered by the transfer layer 14, but, for example, it may be that only parts of the front surfaces or the rear surfaces are covered. In addition, the entire front surface 15Ba of the molded body 15B of the third embodiment is covered by the base film 18, but, for example, it may be that only the front surface or the rear surface is covered. The one ends 11a, 11Aa-11Ia sides of the contact pins 11, 11A-11I are buried in the molded bodies 15, 15A, 15B. In the first embodiment and the second embodiment, the other ends 11b, 11Ab of the contact pins 11, 11A are stuck out from the rear surfaces 15b, 15Ab sides of the molded bodies 15, 15A. Consequently, it is possible to avoid damage to the transfer layer 14 by the contact pin 11F. In addition, the decoration provided by the transfer layer 14 can be applied to the molded body rear surfaces 15b, 15Ab without being hindered by the contact pin 11F. Moreover, in the third embodiment and the fourth embodiment, the other end 11Fb of the contact pin 11F is stuck out from the rear surface 15Bb side of the molded body 15B. In this case, the electrode pattern layer 13 can be sandwiched between the electrically conductive bonding agent 12 on one side and the transfer layer 14, the base film 18, and the design ink layer 19 on the other side, thereby making it possible to prevent an abnormality from arising in the external appearance caused by the electrically conductive bonding agent 12 dissolving, swelling, or the like in the transfer layer 14, the base film 18, or the design ink layer 19.

In the first embodiment through the fourth embodiment, the electrically conductive bonding agent 12 bonds the contact pins 11, 11A, 11B and the electrode pattern layers 13 at inner parts of the molded bodies 15, 15A, 15B. Consequently, it is possible to make do with just a small quantity of the electrically conductive bonding agent 12, thereby preventing any adverse effect on the external appearance or the like of the molded bodies 15, 15A, 15B caused by the electrically conductive bonding agent 12. Furthermore, the contact pins 11, 11A, 11B can be electrically connected reliably to the electrode pattern layer 13.

(12-2)

As shown in FIGS. 4A, 4B, 5A, 5B, 5C, 6A, 6B, 9A, 9B, 9C and 9D, in the contact pin 11, a latching part (portion buried in the molded body) latched to the molded body 15 has a matted front surface that serves as the unevenness, the contact pins 11A, 11E have the knurled grooves 11Ag, 11Dg, which serve as the unevenness, the contact pin 11C has the one end 11Ca, which is spread in a discoidal shape and serves as the unevenness, the contact pin 11D has the ring shaped recessed part 11Dg, which serves as the unevenness, the contact pins 11F, 11I have the openings 11Fc, 11Ic, which serve as holes that latch to the molded bodies, and the contact pins 11G, 11H have the notches 11Gc, 11Hc, which serve as the unevenness. When the contact pins 11, 11A, 11C-11I are latched, the unevennesses, the hole, and the like serve to stop any movement of the contact pin, which makes it possible to implement a latch that tends not to loosen.

(12-3)

For example, in the contact pin 11E shown in FIGS. 6A and 6B, unevenness is provided by the knurled grooves 11Eg in the bonding area that bonds to the electrically conductive bonding agent 12, and the surface area of the bonding area is increased by the unevenness more than in the case wherein the unevenness is not present. When the electrically conductive bonding agent 12 is thus bonded and the contact surface area of the contact pin 11E can thereby be increased, the reliability of the electrical connection between the electrode pattern layer 13 and the contact pin 11E can be improved.

(12-4)

The molded body 15A shown in FIG. 8, the molded body 15C shown in FIG. 12A, and the like each have a support protruding part 16 that is formed at the perimeter of the contact pin 11F and supports the contact pin 11F. By virtue of the contact pin 11F being supported by the support protruding part 16, the contact pin 11F is surely supported without loosening, even at the thin portions of the molded bodies 15A, 15C. As shown in FIG. 8, the support protruding part 16 is further provided with the ribs 17. Thereby, the support of the contact pin 11F by the support protruding part 16 becomes more secure.

As further shown in FIG. 10C and FIG. 12B, the spring part 11Fd may be formed at the portion at which the contact pin 11F is exposed. The spring part 11Fd makes it easy to create a bias in the directions of the arrow Ar, and thereby the electrical connection with the contact terminal 75 of the circuit board connected to the contact pin 11F is stabilized. Furthermore, the formation of the spring part is not limited to the case in which the spring characteristic is imparted by the bending of the contact pin; for example, it is also possible to impart the spring characteristic by fabricating one portion of the contact pin thinly, forming notches, and the like.

(12-5)

As shown in FIG. 18, the electrically conductive bonding agent 12 disposed at an appropriate position is dissolved by the resin melt 65 injected in the injecting process and thereby is caused to bond; consequently, it is possible to make do with a small quantity of the electrically conductive bonding agent 12. Because of this, in the composite molding 10B any adverse effect due to the electrically conductive bonding agent 12 on the external appearance of the base film 18, the design ink layer 19, and the like is prevented.

(12-6)

The process shown in FIG. 17, FIG. 27, and the like is a contact pin positioning process of the mold clamping process, wherein the one end 11Fa side of the contact pin 11F is positioned such that it is located inside the cavity part 55. Thus, it is possible to simply implement a structure wherein the positioned one end 11Fa of the contact pin 11F is buried in an inner part of the molded body 15B, and the one end 11Fa is not exposed to an outer part.

(12-7)

As shown in FIG. 7C, FIG. 28, and the like, the electrically conductive bonding agent 12, which is disposed at an appropriate position, is softened by the resin melt 65 injected in the injecting process and thereby is caused to bond; consequently, it is possible to make do with a small quantity of the electrically conductive bonding agent 12. Because of this, any adverse effect on the transfer layer 14 due to the electrically conductive bonding agent 12 is prevented.

(12-8)

The thickness d1 of the electrically conductive bonding agent 12 in the dry state is preferably 3 µm or greater and less than or equal to 300 µm, and more preferably is 10 µm or greater and less than or equal to 200 µm. When the dry thickness d1 of the electrically conductive bonding agent 12 is in the range described above, it is possible to ensure that the electrical connection does not become inadequate due to an insufficient thickness of the electrically conductive bonding agent 12, while the flow resistance increases and thereby the electrically conductive bonding agent 12 is prevented from flowing during the molding of the molded body 15.

(13) Modified Examples

One embodiment of the present invention was explained above, but the present invention is not limited to the above-mentioned embodiment, and various modifications are possible within a range that does not depart from the scope of the invention. In particular, a plurality of the embodiments and modified examples written in the present specification can be arbitrarily combined as needed.

(13-1)

The abovementioned embodiments explained cases wherein the contact pins 11, 11A-11I are made into columnar shapes, flat plate shapes, and the like, but the shape of the contact pin is not limited to the abovementioned examples and may be some other shape, for example, a hexagonal column or the like.

(13-2)

The abovementioned embodiments explained cases wherein the electrode pattern layer 13, the transfer layer 14, the base film 18, the design ink layer 19, and the like are disposed on the front surfaces 15a, 15Aa, 15Ba of the molded bodies 15, 15A, 15B, 15C, but the location at which these are disposed is not limited to the front surface of the molded body, and they may be disposed on the rear surface or on both surfaces.

(13-3)

The abovementioned embodiments explained cases wherein the contact pins 11, 11A, 11B pierce through the electrode pattern of the electrode pattern layer 13, the transfer portion of the transfer layer 14, the base film of the base film 18, the design ink of the design ink layer 19, and the like but, for example, it is also possible to adopt a configuration such that an opening of the electrode pattern is provided at the location at which the electrode pattern layer 13 pierces through the contact pin, and thereby the electrode pattern is not broken. At this time, if the contact pin is provided in the vicinity of the electrode pattern, then electrical connections for both can be provided by the electrically conductive bonding agent 12. Likewise, it is also possible to adopt a configuration such that the contact pin pierces through a location where the transfer portion of the transfer layer 14, the base film of the base film 18, the design ink of the design ink layer 19, and the like are not present. The modes explained here include the case wherein the other end of the contact pin pierces through the transfer layer, the electrode pattern layer, and the electrically conductive bonding agent and thereby is stuck out from the molded body. (13-4)

In each of the abovementioned embodiments, the electrode pattern layer may have a cut line at the location at which each of the contact pins 11, 11A, 11B pierces through the electrode pattern of the electrode pattern layer 13. If it is also possible to adopt a configuration, the contact pin easily pierces through the electrode pattern.

The invention claimed is:

1. A composite molding comprising:
an insulative molded body molded into a prescribed shape;
an insulative base film covering at least part of a front surface of the molded body and having an electrode pattern layer disposed on the front surface side of the molded body;
an electrically conductive contact pin having one end side which is buried in the molded body and fixed thereto and an other end which pierces through the base film and is exposed; and
an electrically conductive bonding agent formed between the electrode pattern layer and the molded body and bonding to the electrode pattern layer and the contact pin to form an electrical connection between the electrode pattern layer and the contact pin.

2. The composite molding according to claim 1, wherein the contact pin has a portion wherein a latching part having an unevenness or a hole that latches to the molded body is buried in the molding body.

3. The composite molding according to claim 1, wherein in the contact pin, unevenness is provided in a bonding area that bonds to the electrically conductive bonding agent such that the surface area of the bonding area is increased by the unevenness more than in the case in which the unevenness is not present.

4. The composite molding according to claim 1, wherein the molded body has a support protruding part formed at a perimeter of the contact pin and that supports the contact pin.

5. The composite molding according to claim 1, wherein the contact pin has a spring part, which has a spring characteristic, at a portion at which the contact pin is stuck out from the molded body.

6. A composite molding comprising:
an insulative molded body molded into a prescribed shape;
an insulative transfer layer covering at least part of a front surface of the molded body;
an electrode pattern layer formed between the molded body and the transfer layer;
an electrically conductive contact pin having one end side which is buried in the molded body and fixed thereto and an other end which is stuck out from the molded body; and
an electrically conductive bonding agent formed between the electrode pattern layer and the molded body and bonding to the electrode pattern layer and the contact pin to form an electrical connection between the electrode pattern layer and the contact pin.

7. The composite molding according to claim 6, wherein the other end of the contact pin pierces through the transfer layer, the electrode pattern layer, and the electrically conductive bonding agent, and sticks out from the molded body.

8. The composite molding according to claim 6, wherein the one end side of the contact pin is bonded to the electrode pattern layer by the electrically conductive bonding agent and the other end of the contact pin sticks out from a front surface of the molded body on the side opposite the transfer layer.

9. The composite molding according to claim 6, wherein the contact pin has a portion in which a latching part having an unevenness or a hole that latches to the molded body is buried in the molded body.

10. The composite molding according to claim 6, wherein in the contact pin, unevenness is provided in a bonding area that bonds to the electrically conductive bonding agent such that the surface area of the bonding area is increased by the unevenness more than in the case in which the unevenness is not present.

11. The composite molding according to claim 6, wherein the molded body has a support protruding part formed at a perimeter of the contact pin and that supports the contact pin.

12. The composite molding according to claim 6, wherein the contact pin has a spring part, which has a spring characteristic, at a portion at which the contact pin is stuck out from the molded body.

13. A composite molding manufacturing method comprising:
a disposing process during which a base film having an electrode pattern layer to which an electrically conductive bonding agent has been applied is disposed in a first mold, and an electrically conductive contact pin is disposed in a second mold;
a mold clamping process during which the contact pin pierces through the base film at a position at which the electrically conductive bonding agent is applied, and mold clamping of the first mold and the second mold is performed;
an injecting process during which, by the injection of a resin melt into a cavity part formed between the first mold and the second mold, the resin melt flows in along a front surface on which the electrode pattern layer of the base film is formed, and the electrically conductive bonding agent is softened by the heat of the resin melt to bond the electrode pattern layer and the contact pin with the electrically conductive bonding agent; and
a cooling process during which, by the cooling and solidification of the resin melt, a molded body is formed in which at least part of the front surface is covered by the base film, one end side of the contact pin is buried, an other end of the contact pin is stuck out from the base film, and the electrically conductive bonding agent solidifies.

14. The composite molding manufacturing method according to claim 13, wherein
the mold clamping process includes a contact pin positioning process during which the contact pin is positioned such that the one end side of the contact pin is located inside the cavity part.

15. The composite molding manufacturing method according to claim 13, wherein
in the electrically conductive bonding agent, the thickness of the electrically conductive bonding agent in a lamination direction of the molded body and the electrode pattern layer is 3 μm or greater and less than or equal to 300 μm.

16. A composite molding manufacturing method comprising:
- a disposing process during which a base film having a transfer layer and an electrode pattern layer to which an electrically conductive bonding agent has been applied is disposed in a first mold, and an electrically conductive contact pin is disposed in a second mold;
- a mold clamping process during which mold clamping of the first mold and the second mold is performed such that the contact pin contacts the electrically conductive bonding agent or such that the contact pin pierces through the base film;
- an injecting process during which, by the injection of a resin melt into a cavity part formed between the first mold and the second mold, the resin melt flows in along a front surface on which the electrode pattern layer of the base film is formed, and the electrically conductive bonding agent is softened by the heat of the resin melt to bond the electrode pattern layer and the contact pin with the electrically conductive bonding agent; and
- a cooling process during which, by the cooling and solidification of the resin melt, a molded body is formed in which at least part of the front surface is covered by the transfer layer, one end side of the contact pin is buried, an other end of the contact pin is exposed, and the electrically conductive bonding agent solidifies.

17. The composite molding manufacturing method according to claim 16, wherein
- in the electrically conductive bonding agent, the thickness of the electrically conductive bonding agent in a lamination direction of the molded body and the electrode pattern layer is 3 μm or greater and less than or equal to 300 μm.

\* \* \* \* \*